US010571288B2

(12) United States Patent
Zheng et al.

(10) Patent No.: US 10,571,288 B2
(45) Date of Patent: Feb. 25, 2020

(54) SEARCHING SIMILAR TRAJECTORIES BY LOCATIONS

(71) Applicant: Microsoft Technology Licensing, LLC, Redmond, WA (US)

(72) Inventors: Yu Zheng, Beijing (CN); Zaiben Chen, Brisbane (AU); Xing Xie, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 15/411,852

(22) Filed: Jan. 20, 2017

(65) Prior Publication Data

US 2017/0131110 A1 May 11, 2017

Related U.S. Application Data

(62) Division of application No. 12/794,538, filed on Jun. 4, 2010, now Pat. No. 9,593,957.

(51) Int. Cl.
*G01C 21/34* (2006.01)
*G01C 21/26* (2006.01)
(Continued)

(52) U.S. Cl.
CPC ......... *G01C 21/3484* (2013.01); *G01C 21/26* (2013.01); *G01C 21/3667* (2013.01); *G06F 17/11* (2013.01)

(58) Field of Classification Search
CPC G01C 21/3484; G01C 21/26; G01C 21/3667; G06F 17/11
(Continued)

(56) References Cited

U.S. PATENT DOCUMENTS 5,428,546 A 6/1995 Shah et al.
5,802,492 A 9/1998 DeLorme et al.
(Continued)

FOREIGN PATENT DOCUMENTS

EP 1087605 A2 3/2001
EP 1087605 A2 3/2001
(Continued)

OTHER PUBLICATIONS

Office Action for U.S. Appl. No. 15/134,523, dated Feb. 15, 2017, Zheng et al., "Recommending Points of Interests in a Region", 12 pages.
(Continued)

*Primary Examiner* — Krishnan Ramesh
(74) *Attorney, Agent, or Firm* — Schwegman, Lundberg & Woessner, P.A.

(57) ABSTRACT

Techniques for providing a trajectory route to multiple geographical locations of interest are described. This disclosure describes receiving global position system (GPS) logs associated with respective individual devices, each of the GPS logs including trajectories connecting a set of geographical locations previously visited by an individual of a respective individual device. A trajectory route service receives a request for a trajectory connecting a set of geographical locations of interest specified by a user. The trajectory route service calculates a proximal similarity between (1) the set of geographical locations of interest specified by the user, and (2) respective sets of geographical locations from the GPS logs. The trajectory route service constructs the requested trajectory with use of at least one of the trajectories from the GPS logs determined at least in part according to the calculated proximal similarities.

12 Claims, 11 Drawing Sheets

(51) Int. Cl.
    *G01C 21/36* (2006.01)
    *G06F 17/11* (2006.01)
(58) Field of Classification Search
    USPC ........................................................ 701/424
    See application file for complete search history.

(56) References Cited

U.S. PATENT DOCUMENTS

| | | | |
|---|---|---|---|
| 5,845,227 | A | 12/1998 | Peterson |
| 5,904,727 | A | 5/1999 | Prabhakaran |
| 6,023,241 | A | 2/2000 | Clapper |
| 6,091,359 | A | 7/2000 | Geier |
| 6,091,956 | A | 7/2000 | Hollenberg |
| 6,122,628 | A | 9/2000 | Castelli et al. |
| 6,128,279 | A | 10/2000 | O'Neil et al. |
| 6,219,662 | B1 | 4/2001 | Fuh et al. |
| 6,243,647 | B1 | 6/2001 | Berstis et al. |
| 6,317,684 | B1 | 11/2001 | Roeseler et al. |
| 6,317,686 | B1 | 11/2001 | Ran |
| 6,351,775 | B1 | 2/2002 | Yu |
| 6,356,838 | B1 | 3/2002 | Paul |
| 6,385,539 | B1 | 5/2002 | Wilson et al. |
| 6,411,897 | B1 | 6/2002 | Gaspard, II |
| 6,424,370 | B1 | 7/2002 | Courtney |
| 6,427,122 | B1 | 7/2002 | Lin |
| 6,430,547 | B1 | 8/2002 | Busche et al. |
| 6,446,121 | B1 | 9/2002 | Shah et al. |
| 6,493,650 | B1 | 12/2002 | Rodgers et al. |
| 6,496,814 | B1 | 12/2002 | Busche |
| 6,513,026 | B1 | 1/2003 | Horvitz et al. |
| 6,516,272 | B2 | 2/2003 | Lin |
| 6,553,310 | B1 | 4/2003 | Lopke |
| 6,584,401 | B2 | 6/2003 | Kirshenbaum et al. |
| 6,606,643 | B1 | 8/2003 | Emens et al. |
| 6,611,881 | B1 | 8/2003 | Gottfurcht et al. |
| 6,615,130 | B2 | 9/2003 | Myr |
| 6,618,507 | B1 | 9/2003 | Divakaran et al. |
| 6,625,319 | B1 | 9/2003 | Krishnamachari |
| 6,724,733 | B1 | 4/2004 | Schuba et al. |
| 6,732,120 | B1 | 5/2004 | Du |
| 6,785,704 | B1 | 8/2004 | McCanne |
| 6,816,779 | B2 | 11/2004 | Chen et al. |
| RE38,724 | E | 4/2005 | Peterson |
| 6,904,160 | B2 | 6/2005 | Burgess |
| 6,919,842 | B2 | 7/2005 | Cho |
| 6,925,447 | B2 | 8/2005 | McMenimen et al. |
| 6,965,827 | B1 | 11/2005 | Wolfson |
| 6,970,884 | B2 | 11/2005 | Aggarwal |
| 6,981,055 | B1 | 12/2005 | Ahuja et al. |
| 7,003,555 | B1 | 2/2006 | Jungck |
| 7,013,290 | B2 | 3/2006 | Ananian |
| 7,013,517 | B2 | 3/2006 | Kropf |
| 7,031,517 | B1 | 4/2006 | Le et al. |
| 7,062,562 | B1 | 6/2006 | Baker et al. |
| 7,111,061 | B2 | 9/2006 | Leighton et al. |
| 7,136,932 | B1 | 11/2006 | Schneider |
| 7,152,118 | B2 | 12/2006 | Anderson, IV et al. |
| 7,155,456 | B2 | 12/2006 | Abbott, III et al. |
| 7,171,415 | B2 | 1/2007 | Kan et al. |
| 7,194,552 | B1 | 3/2007 | Schneider |
| 7,197,500 | B1 | 3/2007 | Israni et al. |
| 7,203,693 | B2 | 4/2007 | Carlbom et al. |
| 7,219,067 | B1 | 5/2007 | McMullen et al. |
| 7,228,359 | B1 | 6/2007 | Monteiro |
| 7,233,861 | B2 | 6/2007 | Van Buer et al. |
| 7,239,962 | B2 | 7/2007 | Plutowski |
| 7,281,199 | B1 | 10/2007 | Nicol et al. |
| 7,284,051 | B1 | 10/2007 | Okano et al. |
| 7,349,768 | B2 | 3/2008 | Bruce et al. |
| 7,366,726 | B2 | 4/2008 | Bellamy et al. |
| 7,389,283 | B2 | 6/2008 | Adler |
| 7,395,250 | B1 | 7/2008 | Aggarwal et al. |
| 7,428,551 | B2 | 9/2008 | Luo et al. |
| 7,437,239 | B2 | 10/2008 | Serre |
| 7,437,372 | B2 | 10/2008 | Chen et al. |
| 7,447,588 | B1 | 11/2008 | Xu et al. |
| 7,479,897 | B1 | 1/2009 | Gertsch et al. |
| 7,493,294 | B2 | 2/2009 | Flinn et al. |
| 7,519,690 | B1 | 4/2009 | Barrow et al. |
| 7,548,936 | B2 | 6/2009 | Liu et al. |
| 7,561,959 | B2 | 7/2009 | Hopkins et al. |
| 7,574,508 | B1 | 8/2009 | Kommula |
| 7,584,159 | B1 | 9/2009 | Chakrabarti et al. |
| 7,584,301 | B1 | 9/2009 | Joshi |
| 7,603,233 | B2 | 10/2009 | Tashiro |
| 7,610,151 | B2 | 10/2009 | Letchner et al. |
| 7,660,441 | B2 | 2/2010 | Chen et al. |
| 7,685,422 | B2 | 3/2010 | Isozaki et al. |
| 7,706,964 | B2 | 4/2010 | Horvitz et al. |
| 7,707,314 | B2 | 4/2010 | McCarthy et al. |
| 7,710,984 | B2 | 5/2010 | Dunk |
| 7,739,040 | B2 | 6/2010 | Horvitz |
| 7,801,842 | B2 | 9/2010 | Dalton |
| 7,840,407 | B2 * | 11/2010 | Strope .................... G10L 15/26 704/257 |
| 7,860,891 | B2 | 12/2010 | Adler et al. |
| 7,904,530 | B2 | 3/2011 | Partridge et al. |
| 7,920,965 | B1 | 4/2011 | Nesbitt et al. |
| 7,930,427 | B2 | 4/2011 | Josefsberg et al. |
| 7,948,400 | B2 | 5/2011 | Horvitz et al. |
| 7,982,635 | B2 | 7/2011 | Seong |
| 7,984,006 | B2 | 7/2011 | Price |
| 7,991,879 | B2 | 8/2011 | Josefsberg et al. |
| 8,060,462 | B2 | 11/2011 | Flinn et al. |
| 8,117,138 | B2 | 2/2012 | Apte et al. |
| 8,135,505 | B2 | 3/2012 | Vengroff et al. |
| 8,190,649 | B2 | 5/2012 | Bailly |
| 8,219,112 | B1 | 7/2012 | Youssef et al. |
| 8,275,649 | B2 | 9/2012 | Zheng et al. |
| 8,458,298 | B2 | 6/2013 | Josefsberg et al. |
| 8,562,439 | B2 | 10/2013 | Shuman et al. |
| 8,577,380 | B2 | 11/2013 | Frias Martinez et al. |
| 8,972,177 | B2 * | 3/2015 | Zheng .................... G06Q 10/10 701/454 |
| 9,009,177 | B2 | 4/2015 | Zheng et al. |
| 2001/0029425 | A1 | 10/2001 | Myr |
| 2002/0032689 | A1 | 3/2002 | Abbott, III et al. |
| 2002/0038360 | A1 | 3/2002 | Andrews et al. |
| 2002/0044690 | A1 | 4/2002 | Burgess |
| 2002/0052873 | A1 | 5/2002 | Delgado et al. |
| 2002/0062193 | A1 | 5/2002 | Lin |
| 2002/0077749 | A1 | 6/2002 | Doi |
| 2002/0128768 | A1 | 9/2002 | Nakano et al. |
| 2003/0053424 | A1 | 3/2003 | Krishnamurthy et al. |
| 2003/0063133 | A1 | 4/2003 | Foote et al. |
| 2003/0069893 | A1 | 4/2003 | Kanai et al. |
| 2003/0069968 | A1 | 4/2003 | O'Neil et al. |
| 2003/0139898 | A1 | 7/2003 | Miller et al. |
| 2003/0140040 | A1 | 7/2003 | Schiller |
| 2003/0195810 | A1 | 10/2003 | Raghupathy et al. |
| 2003/0212689 | A1 | 11/2003 | Chen et al. |
| 2003/0217070 | A1 | 11/2003 | Gotoh et al. |
| 2003/0229697 | A1 | 12/2003 | Borella |
| 2004/0039798 | A1 | 2/2004 | Hotz et al. |
| 2004/0064338 | A1 | 4/2004 | Shiota et al. |
| 2004/0073640 | A1 | 4/2004 | Martin et al. |
| 2004/0117358 | A1 | 6/2004 | von Kaenel et al. |
| 2004/0196161 | A1 | 10/2004 | Bell et al. |
| 2004/0198386 | A1 | 10/2004 | Dupray |
| 2004/0217884 | A1 | 11/2004 | Samadani et al. |
| 2004/0220965 | A1 | 11/2004 | Harville et al. |
| 2004/0264465 | A1 | 12/2004 | Dunk |
| 2005/0004830 | A1 | 1/2005 | Rozell et al. |
| 2005/0004903 | A1 | 1/2005 | Tsuda |
| 2005/0031296 | A1 | 2/2005 | Grosvenor |
| 2005/0075116 | A1 | 4/2005 | Laird et al. |
| 2005/0075119 | A1 * | 4/2005 | Sheha .................... G01C 21/26 455/456.6 |
| 2005/0075782 | A1 | 4/2005 | Torgunrud |
| 2005/0075784 | A1 | 4/2005 | Gray et al. |
| 2005/0080554 | A1 | 4/2005 | Ono et al. |
| 2005/0108261 | A1 | 5/2005 | Glassy et al. |
| 2005/0131889 | A1 | 6/2005 | Bennett et al. |
| 2005/0198286 | A1 | 9/2005 | Xu et al. |

(56) References Cited

U.S. PATENT DOCUMENTS

| | | |
|---|---|---|
| 2005/0203927 A1 | 9/2005 | Sull et al. |
| 2005/0225678 A1 | 10/2005 | Zisserman et al. |
| 2005/0231394 A1 | 10/2005 | Machii et al. |
| 2005/0265317 A1 | 12/2005 | Reeves et al. |
| 2005/0278371 A1 | 12/2005 | Funk et al. |
| 2006/0020597 A1 | 1/2006 | Keating et al. |
| 2006/0036630 A1 | 2/2006 | Gray |
| 2006/0042483 A1 | 3/2006 | Work et al. |
| 2006/0075139 A1 | 4/2006 | Jungck |
| 2006/0085177 A1 | 4/2006 | Toyama et al. |
| 2006/0085419 A1 | 4/2006 | Rosen |
| 2006/0090122 A1 | 4/2006 | Pyhalammi et al. |
| 2006/0095540 A1 | 5/2006 | Anderson et al. |
| 2006/0101377 A1 | 5/2006 | Toyama et al. |
| 2006/0129675 A1 | 6/2006 | Zimmer et al. |
| 2006/0143442 A1 | 6/2006 | Smith |
| 2006/0149464 A1 | 7/2006 | Chien |
| 2006/0155464 A1 | 7/2006 | Smartt |
| 2006/0156209 A1 | 7/2006 | Matsuura et al. |
| 2006/0161560 A1 | 7/2006 | Khandelwal et al. |
| 2006/0164238 A1 | 7/2006 | Karaoguz et al. |
| 2006/0173838 A1 | 8/2006 | Garg et al. |
| 2006/0178807 A1 | 8/2006 | Kato et al. |
| 2006/0190602 A1 | 8/2006 | Canali et al. |
| 2006/0200539 A1 | 9/2006 | Kappler et al. |
| 2006/0212217 A1 | 9/2006 | Sheha et al. |
| 2006/0224303 A1 | 10/2006 | Hayashi |
| 2006/0224773 A1 | 10/2006 | Degenaro et al. |
| 2006/0247844 A1 | 11/2006 | Wang et al. |
| 2006/0251292 A1 | 11/2006 | Gokturk et al. |
| 2006/0265125 A1 | 11/2006 | Glaza |
| 2006/0266830 A1 | 11/2006 | Horozov et al. |
| 2007/0005419 A1 | 1/2007 | Horvitz et al. |
| 2007/0006098 A1 | 1/2007 | Krumm et al. |
| 2007/0016663 A1 | 1/2007 | Weis |
| 2007/0038362 A1 | 2/2007 | Gueziec |
| 2007/0041393 A1 | 2/2007 | Westhead et al. |
| 2007/0064633 A1 | 3/2007 | Fricke |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1 | 5/2007 | McCarthy et al. |
| 2007/0127833 A1 | 6/2007 | Singh |
| 2007/0168208 A1 | 7/2007 | Aikas et al. |
| 2007/0203638 A1 | 8/2007 | Tooyama et al. |
| 2007/0226004 A1 | 9/2007 | Harrison |
| 2008/0004789 A1 | 1/2008 | Horvitz et al. |
| 2008/0004793 A1 | 1/2008 | Horvitz et al. |
| 2008/0016051 A1 | 1/2008 | Schiller |
| 2008/0016233 A1 | 1/2008 | Schneider |
| 2008/0052303 A1 | 2/2008 | Adler et al. |
| 2008/0059576 A1 | 3/2008 | Liu et al. |
| 2008/0071465 A1* | 3/2008 | Chapman .......... G01C 21/3691 701/117 |
| 2008/0076451 A1 | 3/2008 | Sheha et al. |
| 2008/0086574 A1 | 4/2008 | Raciborski et al. |
| 2008/0098313 A1 | 4/2008 | Pollack |
| 2008/0201074 A1 | 8/2008 | Bleckman et al. |
| 2008/0201102 A1 | 8/2008 | Boettcher et al. |
| 2008/0214157 A1 | 9/2008 | Ramer et al. |
| 2008/0215237 A1 | 9/2008 | Perry |
| 2008/0228396 A1 | 9/2008 | Machii et al. |
| 2008/0228783 A1 | 9/2008 | Moffat |
| 2008/0235383 A1 | 9/2008 | Schneider |
| 2008/0268876 A1 | 10/2008 | Gelfand et al. |
| 2008/0270019 A1 | 10/2008 | Anderson et al. |
| 2008/0312822 A1 | 12/2008 | Lucas et al. |
| 2008/0319648 A1 | 12/2008 | Poltorak |
| 2008/0319660 A1 | 12/2008 | Horvitz et al. |
| 2008/0319974 A1 | 12/2008 | Ma et al. |
| 2009/0005987 A1 | 1/2009 | Vengroff et al. |
| 2009/0019181 A1 | 1/2009 | Fang et al. |
| 2009/0063646 A1 | 3/2009 | Mitnick |
| 2009/0070035 A1 | 3/2009 | Van Buer |
| 2009/0083128 A1 | 3/2009 | Siegel |
| 2009/0083237 A1 | 3/2009 | Gelfand et al. |
| 2009/0100018 A1 | 4/2009 | Roberts |
| 2009/0138188 A1 | 5/2009 | Kores et al. |
| 2009/0164516 A1 | 6/2009 | Svendsen et al. |
| 2009/0213844 A1 | 8/2009 | Hughston |
| 2009/0216435 A1 | 8/2009 | Zheng et al. |
| 2009/0216704 A1 | 8/2009 | Zheng et al. |
| 2009/0222581 A1 | 9/2009 | Josefsberg et al. |
| 2009/0228198 A1 | 9/2009 | Goldberg et al. |
| 2009/0239552 A1 | 9/2009 | Churchill et al. |
| 2009/0282122 A1 | 11/2009 | Patel et al. |
| 2009/0326802 A1 | 12/2009 | Johnson |
| 2010/0004997 A1 | 1/2010 | Mehta et al. |
| 2010/0010991 A1 | 1/2010 | Joshi |
| 2010/0027527 A1 | 2/2010 | Higgins et al. |
| 2010/0070171 A1 | 3/2010 | Barbeau et al. |
| 2010/0076968 A1 | 3/2010 | Boyns et al. |
| 2010/0082611 A1 | 4/2010 | Athsani et al. |
| 2010/0111372 A1 | 5/2010 | Zheng et al. |
| 2010/0153292 A1 | 6/2010 | Zheng et al. |
| 2010/0279616 A1 | 11/2010 | Jin et al. |
| 2010/0312461 A1 | 12/2010 | Haynie et al. |
| 2011/0022299 A1 | 1/2011 | Feng et al. |
| 2011/0029224 A1 | 2/2011 | Chapman et al. |
| 2011/0130947 A1 | 6/2011 | Basir |
| 2011/0173015 A1 | 7/2011 | Chapman et al. |
| 2011/0176000 A1 | 7/2011 | Budge et al. |
| 2011/0184949 A1 | 7/2011 | Luo |
| 2011/0191011 A1 | 8/2011 | McBride et al. |
| 2011/0191284 A1 | 8/2011 | Dalton |
| 2011/0208419 A1 | 8/2011 | Boss et al. |
| 2011/0280453 A1 | 11/2011 | Chen et al. |
| 2011/0282798 A1 | 11/2011 | Zheng et al. |
| 2011/0302209 A1 | 12/2011 | Flinn et al. |
| 2012/0030029 A1 | 2/2012 | Flinn et al. |
| 2012/0030064 A1 | 2/2012 | Flinn et al. |
| 2012/0150425 A1 | 6/2012 | Chapman et al. |
| 2012/0256770 A1 | 10/2012 | Mitchell |
| 2013/0166188 A1 | 6/2013 | Zheng et al. |
| 2014/0088791 A1 | 3/2014 | Alpert et al. |
| 2015/0117713 A1 | 4/2015 | Zheng et al. |
| 2015/0186389 A1 | 7/2015 | Zheng et al. |
| 2016/0232179 A1 | 8/2016 | Zheng et al. |

FOREIGN PATENT DOCUMENTS

| | | |
|---|---|---|
| GB | 2421653 | 6/2006 |
| JP | 2002140362 | 5/2002 |
| JP | 2002304408 A | 10/2002 |
| JP | 2003044503 A | 2/2003 |
| KR | 20050072555 A | 7/2005 |
| KR | 20060006271 A | 1/2006 |
| KR | 100650389 B1 | 11/2006 |
| WO | WO2006097907 A2 | 9/2006 |
| WO | WO2007087615 A | 8/2007 |
| WO | WO2007145625 A | 12/2007 |
| WO | WO2009053411 A | 4/2009 |
| WO | WO2010062726 A2 | 6/2010 |

OTHER PUBLICATIONS

The European Office Action dated Feb. 21, 2017 for European Patent Application No. 09714738.3, a counterpart foreign application of U.S. Pat. No. 8,972,177, 7 pages.

Office action for U.S. Appl. No. 12/712,857, dated Mar. 3, 2017, Zheng, et al., "Map-Matching for Low-Sampling-Rate GPS Trajectories", 7 pages.

Office Action for U.S. Appl. No. 15/134,523, dated Apr. 6, 2017, Zheng et al., "Recommending Points of Interests in a Region", 15 pages.

Lippi, et al., Collective Traffic Forecasting, Proceedings of the European Conference on Machine Learning and Principles and Practice of Knowledge Discovery Database, ECML PKDD 2010, pp. 259-273, 2010.

Liu, et al., Uncovering cabdrivers' behavior patterns from their digital traces, Computers, Environment and Urban Systems, Jul. 2010, 8 pages.

(56) References Cited

OTHER PUBLICATIONS

Lou, et al., "Map-Matching for Low-Sampling-Rate GPS Trajectories," ACM GIS '09, ISBN 978-1-60558-649, Nov. 4-6, 2009, pp. 1-10.
Lozano, et al., Spatial-temporal Causal Modeling for Climate Change Attribution, KDD 2009, Paris France, ACM 2009, 10 pages.
Mamoulis, Cao, Kollios, Hadjieleftheriou, Tao, Cheung, "Mining, Indexing, and Querying Historical Spatiotemporal Data", retrieved on Dec. 29, 2009 at <<http://i.cs.hku.hk/~nikos/sigkdd2004_1.pdf>>, ACM Proceedings of Conference on Knowledge Discovery and Data Mining (KDD), Aug. 22, 2004, pp. 236-245.
Manning et al., "An Introduction to Information Retrieval", DRAFT, Cambridge University Press, Apr. 1, 2009, 581 pages, retrieved on Apr. 16, 2010 at <<http://nlp.stanford.edu/IR-book/pdf/irbookonlinereading.pdf>>.
Markowetz, et al., "Design and Implementation of a Geographic Search Engine", Eighth International Workshop on the Web Databases (WebDB 2005), Baltimore, MD, Jun. 16-17, 2005, Baltimore, MD, 6 pages.
Masoud, et al., "Fast Algorithms for Outlier Detection", retrieved on Dec. 12, 2008 at <<http://www.scipub.org/fulltext/jcs/cs42129-132.pdf>>, Journal of Computer Science, vol. 4, No. 2, 2008, pp. 129-132.
Matsuo et al, "Inferring Long Term User Properties Based on Users' Location History", Proc 20th Intl Joint Conf on Artificial Intelligence, Jan. 2007, 7 pgs.
McDonald et al, "Expertise Recommender: A Flexible Recommendation System and Architecture", CSCW 2000, Dec. 2000, 10 pgs.
McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carto 8 Conference Proceedings (ASPRS and ACSM), 1987, pp. 754-763.
Mead, Nick, "Lifeblog 2.5," retrieved at <<http://lifeblog.en.softonic.com/symbian>>, Feb. 25, 2008, 2 pages.
Michael et al, "Location Based Intelligence—Modeling Behavior in Humans Using GPS", Proc Intl Symposium on Technology and Society, Jun. 2006, 8 pgs.
Miller, "Analysis of Fastest and Shortest Paths in an Urban City Using Live Vehicle Data from a Vehicle-to- Infrastructure Architecture", retrieved on Dec. 24, 2009 at <<http://www.sigmacoding.com/jeff/publications/fastest-path-fac09.pdf>>, Federation on Automatic Control Symposium on Control in Transportation Systems (IFAC), Sep. 2009., pp. 1-5.
Min-qi, et al., "An Algorithm for Spatial Outlier Detection Based on Delaunay Triangulation", In the Proceedings of the 2008 International Conference on Computational Intelligence and Security, Dec. 2008, pp. 102-107.
Mitchell, et al., "Six in the City: Introducing Real Tournament—A Mobile IPv6 Based Context-Aware Multiplayer Game", NetGames'03, May 2003, pp. 91-100.
Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing, ICIP 2007, vol. 3, 2007, pp. 225-228.
Monreale, et al., "WhereNext: a Location Predictor on Trajectory Pattern Mining", retrieved Aug. 4, 2009 at <<http://delivery.acm.org/10.1145/1560000/1557091/p637-monreale.pdf?key1=1557091&key2=5182739421&coll=GUIDE&dl=GUIDE&CFID=47499709&CFTOKEN=90308932>>, ACM, KDD 2009, 2009, pp. 637-645.
Morimoto, "Mining Frequent Neighboring Class Sets in Spatial Databases", retrieved on Dec. 29, 2009 at <<http://delivery.acm.org/10.1145/510000/502564/p353-morimoto.pdf?key1=502564&key2=1634712621&coll=GUIDE&dl=GUIDE&CFID=70432903&CFTOKEN=93744375>>, ACM Proceedings of Conference on Knowledge Discovery and Data Mining (KDD), 2001, pp. 353-358.
Morse, Patel, "An Efficient and Accurate Method for Evaluating Time Series Similarity", retrieved at Apr. 15, 2010 at <<http://www.eecs.umich.edu/db/files/sigmod07timeseries.pdf>>, ACM, Proceedings of Conference on Management of Data, Jun. 11, 2007, pp. 569-580.
Mountain Bike. http://www.mtb-tracks.co.uk/northyorkmoors/default.aspx, retrieved Jan. 18, 2008, 2 pages.
Nascimento, et al., "Evaluation of Access Structures for Discretely Moving Points", Proceedings of the International Workshop on Spatio-Temporal Database Management, Sep. 1, 1998, State Univ. of Campinas, Brazil, 18 pp.
Nascimento et al., "Towards historical R-trees," Proc. of the ACM Symp. on Applied Computing, SAC, pp. 235-240, Feb. 1998, 6 pages.
Nicholson, "Finding the Shortest Route Between Two Points in a Network", British Computer Society, The Computer Journal, 1966, vol. 9, No. 3, pp. 275-280.
"North York Moors and Yorkshire Wolds Mountain Bke (MTB) Routes", retrieved on Jan. 17, 2008 from <<http://www.mtb-routs.co.uk/northyorkmorrsk/default.aspx>>, 4 pages.
Notice to File Corrected Application Papers U.S. Appl. No. 12/794,538, dated Mar. 11, 2010, Zheng et al. "Mining Correlation Between Locations Using Location History", 2 pages.
Nzouonta, et al, VANET Routing on City Roads using Real-Time Vehicular Traffic Information, IEEE Transactions on Vehicular Technology, vol. 58, No. 7, Sep. 2009, <<http://web.njit.edu/~gwang/publications/TVT09.pdf>>.
Office action for U.S. Appl. No. 12/037,347, dated Jan. 13, 2014, Zheng, et al., "System for Logging Life Experiences Using Geographic Cues", 8 pages.
Office action for U.S. Appl. No. 12/712,857, dated Feb. 21, 2014, Zheng, et al., "Map-Matching for Low-Sampling-Rate GPS Trajectories", 15 pages.
Office action for U.S. Appl. No. 12/353,940, dated Mar. 4, 2014, Zheng, et al., "Detecting Spatial Outliers in a Location Entity Dataset", 10 pages.
Office Action for U.S. Appl. No. 12/041,599, dated Jul. 25, 2011, Arne Josefsberg, "Failover in an Internet Location Coordinate Enhanced Domain Name System", 22 pgs.
Office action for U.S. Appl. No. 12/712,857, dated Aug. 5, 2013, Zheng, et al., "Map-Matching for Low-Sampling-Rate GPS Trajectories", 15 pages.
Office Action for U.S. Appl. No. 12/037,347, dated Aug. 17, 2011, Yu Zheng, "System for Logging Life Experiences Using Geographic Cues", 9 pgs.
Office action for U.S. Appl. No. 12/794,538, dated Sep. 13, 2013, Zheng, et al., "Searching Similar Trajectories by Locations", 12 pages.
Office action for U.S. Appl. No. 13/324,758, dated Jan. 18. 2013, Zheng et al., "Urban Computing of Route-Oriented Vehicles", 48 pages.
Office action for U.S. Appl. No. 12/712,857, dated Jan. 6, 2015, Zheng, et al., "Map-Matching for Low-Sampling-Rate GPS Trajectories", 15 pages.
Dffice Action for U.S. Appl. No. 13/195,496, dated Oct. 21, 2011, Yu Zheng, "Learning Transportation Modes from Raw GPS Data", 7 pages.
Office action for U.S. Appl. No. 12/711,130, dated Oct. 4, 2012, Zheng et al., "Mining Correlation Between Locations Using Location History", 15 pages.
Final Office Action for U.S. Appl. No. 12/712,857, dated Oct. 7, 2015, Yu Zheng, "Map-Matching for Low-Sampling-Rate GPS Trajectories", 18 pages.
Office Action for U.S. Appl. No. 12/037,263, dated Oct. 8, 2010, Longhao Wang, "Indexing Large-Scale GPS Tracks", 7 pages.
Office action for U.S. Appl. No. 13/188,013, dated Nov. 15, 2011, Josefsberg et al., "Internet Location Cordinate Enhanced Domain Name System", 14 pages.
Office Action for U.S. Appl. No. 12/353,940, dated Nov. 2, 2012, Zheng et al., "Detecting Spatial Outliers in a Location Entity Dataset", 11 pages.
Office action for U.S. Appl. No. 12/041,608, dated Nov. 22, 2013, Josefsberg, et al., "Client-Side Management of Domain Name Information", 7 pages.

(56) References Cited

OTHER PUBLICATIONS

Office action for U.S. Appl. No. 12/794,538, dated Nov. 25, 2013, Zheng, et al., "Searching Similar Trajectories by Locations", 18 pages.
Office action for U.S. Appl. No. 13/324,758, dated Nov. 28, 2016, Zheng et al., "Urban Computing of Route-Oriented Vehicles", 7 pages.
Office action for U.S. Appl. No. 12/794,538, dated Nov. 29, 2011, Zheng et al. "Searching Similar Trajectories by Locations", 10 pages.
Office Action for U.S. Appl. No. 15/134,523, dated Nov. 4, 2016, Zheng et al., "Recommending Points of Interests in a Region", 12 pages.
Office action for U.S. Appl. No. 12/567,667, dated Dec. 19, 2012, Zheng et al., "Recommending Points of Interests in a Region", 18 pages.
Office Action for U.S. Appl. No. 13/324,758, dated Dec. 24, 2014, Zheng et al., "Urban Computing of Route-Oriented Vehicles", 54 pages.
Office Action for U.S. Appl. No. 12/562,588, dated Dec. 8, 2011, Yu Zheng, "Mining Life Pattern Based on Location History", 31 pgs.
Ward et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth,edu/~tanzeem/pubs/AAA1051WyattD.pdf>>.
Wasinger, et al., "M3I in a Pedestrian Navigation & Exploration System", Proceedings of the Fifth International Symposium on Human Computer Interaction with Mobile Devices, Sep. 2003, 5 pages.
Weeks, Darren, "LifeLog: Because Big Brother Cares What You're Thinking," retrieved at <<http://www.sweetliberty.org/issues/privacy/lifelog.htm>> on Dec. 3, 2005, Big Brother, 5 pages.
Wei, et al., "A Service-Portlet Based Visual Paradigm for Personalized Convergence of Information Resources", 2nd IEEE International Conference on Computer Science and Information Technology, Aug. 2009, pp. 119-124.
"Weka 3: Data Mining Software in Java", retreived on Jan. 18, 2008 from <<http://www.cs.waikato.ac.nz/mt/weka/index_home.html>>, 1 page.
"Welcome to WalkJogRun", retrieved on Jan. 17, 2008 from <<http://www.walkjogrun.net>>, 1 page.
Weng et al., "Design and Implementation of Spatial-temporal Data Model in Vehicle Monitor-System", Proceeding of the 8th International Conference on Geocomputation, Aug. 3, 2005, pp. 1-8.
Wikipedia, "DARPA LifeLog," retrieved at <<https://en.wikipedia.org/wiki/DARPA_LifeLog>>, Dec. 14, 2013, 1 page.
Wikipedia, "Nokia Lifeblog", retrieved at <<https://en.wikipedia.org/wiki/Nokia_Lifeblog>>, on Feb. 26, 2008, 2 pages.
Wikipedia, "Operating System", retrived from <<http://en.wikipedia.org/wiki/Operating_system>> on Oct. 8, 2010, 17 pgs.
"WikiWalki Community Trail Guide", retrieved on Jan. 17, 2008 from <<http://www.wikiwalki.com>>, 1 page.
Winogard, "Dynamic Cartograms for Navigating Geo-referenced Photographs", available at least as early as Nov. 16, 2007, at <<http://cs.stanford.edu/research/project.php?id=289>>, pp. 2.
Wu, et al., Spatio-Temporal Outlier Detection in Precipitation Data, Knowledge Discovery from Sensor Data, pp. 115-133, 2010, <<http://sydney.edu.au/engineering/it/~ewu1/publications/WuLiuChawlaSensorKDD2008.pdf>>.
Wyatt et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, pp. 21-27, 7 pages.
Xiao, Xie, Luo, Ma, "Density Based Co-Location Pattern Discovery", retrieved on Dec. 29, 2009 at <<http://www.cse.ust.hk/~xiaoxy/pub/gis-08.pdf>>, ACM Proceedings of Conference on Advances in Geographic Information Systems (SIGSPATIAL), OLAP and co-location mining, Article 29, Nov. 5, 2008, pp. 1-10.
Xie, Zheng, "GeoLife: Building social networks using human location history", retrieved on Apr. 15, 2010 at <<http://research.microsoft.com/en-us/projects/geolife/>>, Microsoft Corporation, 2010, pp. 1-8.
Xie, "Understanding User Behavior Geospatially", Microsoft Research, Nov. 2008, 2 pgs.
Xu et al., "RT-Tree: An Improved R-Tree Indexing Structure for Temporal Spatial Databases," Proc. of the Intl. Symp. on Spatial Data Handling, SDH, pp. 1040-1049, Jul. 1990, 5 pages.
Xue, "Efficient Similarity Search in Sequence Databases", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.
Yan, et al., "Clospan: Mining Closed Sequential Patterns in Large Datasets", retrieved on Aug. 4, 2009 at <<http://citeseerx.ist.psu.edu/viewdoc/download;jsessionid=AFADA02A222CC497F30CEC7317F6C7A5?doi=10.1.1.12.3538&rep=rep1&type=pdf>>, Proceedings of SIAM Int. Conference on Data Mining, SDM 2003, 2003, pp. 166-177.
Yan, et al., Discovery of frequent substructures, Wiley-Interscience, 2007, 99-113.
Yan, et al., "Feature-based Similarity Search in Graph Structures", ACM Transactions on Database Systems, vol. V, No. N, Jun. 2006, 36 pages.
Yavas, et al., "A data mining approach for location prediction in mobile environments", retrieved on Aug. 4, 2009 at <<http://www.cs.bilkent.edu.tr/~oulusoy/dke05.pdf>>, Elsevier B.V., 2004, pp. 121-146.
Ye, et al., "Mining Individual Life Pattern Based on Location History," Tenth International Conference on Mobile Data Management: Systems, Services and Middleware, May 18-20, 2009, Taipei, 10 pages.
Yegulalp, Change the Windows 2000 DNS cache, retrieved on Apr. 29, 2008 at <<http://searchwincomputing.techtarget.com/tip/0,289483,sid68_gci1039955,00.html>>, SearchWinComputing.com, pp. 1-3.
Yi, Jagadish, Faloutsos, "Efficient Retrieval of Similar Time Sequences under Time Warping", retrieved on Apr. 15, 2010, IEEE Computer Society, Presentation: Proceedings of Conference on Data Engineering (ICDE), 1998, pp. 1-15.
Yuan et al., "An Interactive-Voting Based Map Matching Algorithm," In IEEE Conference on Mobile Data Management (MDM), 2010, 10 pages.
Yuxiang, et al., Detecting Spatio-temporal Outliers in Climate Dataset: A Method Study, IEEE 2005, pp. 760-763.
Zhang, et al., "A Taxonomy Framework for Unsupervised Outlier Detection Techniques for Multi-Type Data Sets," Technical Report TR-CTIT-07-79, Centre for Telematics and Information Technology University of Twente, Enschede, Nov. 2007, pp. 1-40.
Zhang, Mamoulis, Cheung, Shou, "Fast Mining of Spatial Collocations", retrieved on Dec. 29, 2009 at <<http://i.cs.hku.hk/~dcheung/publication/sigkdd2004_2.pdf>>, ACM Proceedings of Conference on Knowledge Discovery and Data Mining (SIGKDD), Aug. 22, 2004, pp. 384-393.
Zhang et al., iBAT: Detecting Anomalous Taxi Trajectories from GPS Traces, Proceedings of UbiComp Sep. 2011, 10 pages.
Zhang et al., "Mining Non-Redundant High Order Correlations in Binary Data", International Conference on Very Large Data Bases (VLDB), Aukland, NZ, Aug. 23-28, 2008, pp. 1178-1188.
Zhang, et al., Network Anomography, USENIX Association, Internet Measurement Conference 2005, pp. 317-330.
Zhang, et al., "Research on Information Fusion on Evaluation of Driver Fatigue", 2008 International Symposium on Computer Scientc and Computational Technology, Dec. 2008, pp. 151-155.
Zhao, et al., "Searching for Interacting Features", Proceedings of the 20th International Joint Conference on Artificial Intelligence, Hyderabad, India, Jan. 6-12, 2007, pp. 1156-1161.
Zheng et al., "Collaborative Filtering Meets Mobile Recommendation: A User-centered Approach", to be presented at the Association for the Advancement of Artificial Intelligence (AAAI) 24th Con-

(56) References Cited

OTHER PUBLICATIONS ference on Artificial Intelligence, Atlanta, Georgia, Jul. 11-15, 2010, 6 pages., retrieved on Apr. 16, 2010 at <<http://research.microsoft.com/pubs/122244/AAAI10-Collaborative%20Filtering%20Meets%20Mobile%20Recommendation%20A%20User-centered%20Approach.pdf>>.

Zheng et al., "Collaborative Location and Activity Recommendations with GPS History Data," Proceedings of the 19th International Conference on World Wide Web, 2010, pp. 1029-1038.

Zheng et al., "Cross-domain Activity Recognition," In Proc. Of the 11th International Conference on Ubiquitous Computing (Orlando, USA, 2009), ACM Press, pp. 61-70.

Zheng et al., GeoLife: A Collaborative Social Networking Service among User, Location and Trajectory. IEEE Date Engineer Bulletin, 33(2). IEEE press 2010, 32-40, <<http://sites.computer.org/debull/A10june/geolife.pdf>>.

Zheng, et al., "GeoLife: Managing and Understanding Your Past Life over Maps", IEEE Computer Society, in the Proceedings of the Ninth International Conference on Mobile Data Management, 2008, pp. 211-212, 2 pgs.

Zheng, Wang, Zhang, Xie, Ma, "GeoLife: Managing and Understanding Your Past Life over Maps", retrieved on Dec. 29, 2009 at <<http://research.microsoft.com/en-us/people/yuzheng/zheng-geolife-managing_and_understanding_your_past_life_over_map.pdf>>, IEEE Computer Society, Proceedings of Conference on Mobile Data Manage, 2008, pp. 211-212.

Zheng et al., "GeoLife2.0: A Location-Based Social Networking Service", Proceedings of the 10th International Conference on Mobile Data Management Systems, Services and Middleware, Taipei, Taiwan, May 18-20, 2009, pp. 357-358, retrieved on Apr. 16, 2010 at <<http://ieeexplore.ieee.org/stamp/stamp.jsp?tp=&arnumber=5088957>>.

Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=GUIDE&dl=GUIDE&CFID=86381688&CFTOKEN=49903381>>.

Zheng et al., "Learning Transportation Mode from Raw GPS Data for Geographic Applications on the Web", ACM Conference on World Wide Web (ACM WWW 2008)), Apr. 21, 2008, pp. 247-256, retrieved on Apr. 16, 2010 at <<http://research.microsoft.com/pubs/78567/fp485-Zheng.pdf>>.

Zheng et al., "Microsoft GeoLife Project, GeoLife: Building social networks using human location history", Microsoft Research, 2009, 4 pages, retrieved on Apr. 16, 2010 at <<http://research.microsoft.com/en-us/projects/geolife/default.aspx>>.

Zheng et al., "Mining Interesting Locations and Travel Sequences from GPS Trajectories", Proceedings of the 18th International Conference on World Wide Web (WWW 2009), Madrid, Spain, Apr. 20-24, 2009, pp. 791-800, retrieved on Apr. 16, 2010 at <<http://research.microsoft.com/pubs/79440/fp120-zheng.pdf>>.

Zheng, et al., Recommending friends and locations based on individual location history. In ACM Transaction on the Web, 2011, 44 pages, <<http://research.microsoft.com/pubs/122435/RecomFriend-zheng-Published.pdf>>.

Zheng et al., "Recommending Friends and Locations Based on Individual Location History", ACM Trans. Asian Language Information Processing, vol. 6, No. 3, Article 9, Ch. 45, Nov. 2007, 47 pages, retrieved on Apr. 16, 2010 at <<http://research.microsoft.com/pubs/122435/Recommending%20friends%20and%20locations%20based%20on%20individual%20location%20history.pdf>>.

Zheng, et al., "Searching Your Life on Web Maps", Microsoft Research, Available at <<http://research.microsoft.com/en-us/people/yuzheng/searching_your_life_over_web_maps_pdf>>, 2008, 4 pgs.

Zheng, et al., T-Drive: Driving Directions based on Taxi Trajectories, In Proc. ACM SIGSPATIAL GIS 2010. ACM Press, 2010, 10 pages, <<http://www.cse.unt.edu/~huangyan/6350/paperList/T-Drive.pdf>>.

International Preliminary Report on Patentability cited in PCT Application No. PCT/US2009/032777 dated Sep. 10, 2010, 6 pages.

Intl Search Report for PCT/US2009/063023, dated Jun. 10, 2010, 4 pgs.

Ishi, et al., "Head Motion During Dialogue Speech and Nod Timiong Control in Humanoid Robots", 5th ACM/IEEE International Conference on Human-Robot Interaction (HRI'10), Mar. 2010, pp. 293-300.

International Search Report and Written Opinion Received for PCT Application No. PCT/US2009/0327777, dated Aug. 26, 2009, 10 pages.

International Search Report dated Aug. 19, 2009 for PCT Application No. PCT/US2009,032778, filed Jan. 31, 2009, 11 pages.

Jan, Horowitz, Peng, "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44.

Jarvelin et al, "Cumulated Gain Based Evaluation of IR Techniques", ACM Transactions on Information Systems, vol. 20, No. 4, Oct. 2002, 25 pgs.

Jing, et al., "Hierarchical Optimization of Optimal Path Finding for Transportation Applications", (University of Michigan Research Paper, 1996, pp. 269-276) In the Proceedings of the Fifth International Conference on Informaton and Knowledge Management, 1996, pp. 261-268.

Jones et al, "P3 Systems: Putting the Place Back into Social Networks", IEEE Internet Computing, Sep.-Oct. 2005, 9 pgs.

Kanoulas, Du, Xia, Zhang, "Finding Fastest Paths on a Road Network with Speed Patterns", retrieved on Dec. 24, 2009 at <<http://www.inf.unibz.it/dis/teaching/SDB/paper/kanoulasDXZ_icde06_fastestpath.pdf>>, IEEE Computer Society, Proceedings of Conference on Data Engineering (ICDE), 2006, pp. 1-10.

Kavouras, et al., "A Method for the Formalization and Integration of Geographic Categorizations", Draft version from the International Journal of Geographic Information Science, vol. 16, No. 5, 2002, pp. 439-453.

Ke, et al., "Correlated Pattern Mining in Quantitative Databases", ACM Transactions on Database Systems, vol. V, No. 4, Apr. 2008, 44 pages.

Ke, et al., "Efficient Correlations Search from Graph Databases", IEEE Transactions on Knowledge and Data Engineenng, vol. 20, Issue 12, Dec. 2008, pp. 1601-1615.

Kharrat, Popa, Zeitouni, Faiz, "Clustering Algorithm for Network Constraint Trajectories", retrieved on Apr. 15, 2010 at <<http://www.prism.uvsq.fr/~karima/papers/SDH_08.pdf>>, Springer Berlin, Symposium on Spatial Data Handling (SDH), 2008, pp. 631-647.

Kim et al., "A Spatiotemporal Data and Indexing, Proceedings of IEEE Region 10 International Conference eon Electrical and Electronic Technology," Singapore, Aug. 19-22, 2001, pp. 110-113.

Kindberg, et al., Urban computing. Pervasive computing. IEEE Computer Society. 6, 3, pp. 18-20. Aug. 2007, <<http://ieeexplore.ieee.org/stamp/stamp.jsp?tp=&arnumber=4287439&userType=inst>>.

Klemmer, et al., "Where Do Web Sites Come From? Capturing and Interacting with Design History," CHI, Contextual Displays Paper, Apr. 20-25, 2002, vol. 4, No. 1, pp. 1-8.

Kollios, et al., "Indexing Animated Objects Using Spatiotemporal Access Methods," A TimeCenter Technical Report, TR-54, Jan. 25, 2001, pp. 1-32.

Kolovson et al., "Segment Indexes: Dynamic Indexing Techniques for Multi-Dimensional Interval Data," Proceedings of the ACM SIGMOD Conference on Management of Data, 1991, pp. 138-147, 10 pages.

Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn_dimcurse_2001.pdf>>, IEEE Educational Activities Department, Transactions on Knowledge and Data Engineering, vol. 13, No. 1, Jan. 2001, pp. 96-111.

(56) References Cited

OTHER PUBLICATIONS

Kostakos, et al., Urban computing to bridge online and real-world social networks. Handbook of Research on Urban Informatics, 2008, <<http://hci.uma.pt/courses/ubicomp/papers/social/kostakos-08.pdf>> 9 pages.

Kou, et al., "Spatial Weighted Outlier Detection", retrieved on Dec. 12, 2008 at <<http://www.siam.org/proceedings/datamining/2006/dm06_072kouy.pdf>>, SIAM Conference on Data Mining, 2006, pp. 614-618.

Krumm, et al., "LOCADIO: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, 2004, pp. 4-13.

Krumm, et al., "Predestination: Inferring Destinations from Partial Trajectories", retrieved on Aug. 4, 2009 at <<http://research.microsoft.com/en-us/um/people/horvitz/predestination.pdf>>, UBICOMP 2006, 2006, pp. 1-18.

Krumm, et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-107.

Kuechne et al., "New Approaches for Traffic Management in Metropolitan Areas," In 10th IFAC Symposium on Control in Transportation Systems, Aug. 2003, 9 pages.

Kumar, et al., "Approximate Minimum Enclosing Balls in High Dimensions Using Core-Sets," Journal of Experimental Algorithmics (JEA), vol. 8, 2003, Artl. No. 1.1, pp. 1-29.

Kumar, et al., "Designing Access Methods for Bitemporal Databases," IEEE Trans. Knowl. Data Eng., 1998, pp. 1-41.

Lafferty, et al., "Conditional Random Fields: Probabilistic Models for Segmenting and Labeling Sequence Data", Proceedings of the 18th International Conference on Machine Learning, Jun. 2001, 8 pages.

Lakhina, et al., Diagnosing Network-Wide Traffic Anomalies, In Proceedings of the SIGCOMM 2004 Conference, 12 pages, 2004 ACM.

Lavondes, et al., "Geo::PostalAddress—Country-specific postal address parsing/formatting", retrieved on Dec. 16, 2008 at <<http://search.cpan.org/~pauamma/Geo-PostalAddress-0.04/PostalAddress.pm>>, CPAN, 2004, pp. 1-8.

Lee et al, "Efficient Mining of User Behaviors by Temporal Mobile Access Patterns", Intl Journal of Computer Science and Network Security, vol. 7, No. 2, Feb. 2007, 7 pgs.

Lee, et al., "TraClass: Trajectory Classification Using Hierarchical Region-Based and Trajectory-Based Clustering", retrieved on Aug. 4, 2009 at <<http://www.cs.uiuc.edu/homes/hanj/pdf/vldb08_jglee.pdf>>, ACM, VLDB 2008, vol. 1, Issue 1, 2008, pp. 1081-1094.

Lee, et al., Trajectory Clustering: A Partition-and-group Framework, In Proceedings of the 26th ACM SIGMOD International Conference on Management of Data 2007, pp. 593-604, 2007.

Lee et al., "Trajectory Clustering: A Partition-and-Group Framework", retrieved on Aug. 4, 2009 at <<http://www.cs.uiuc.edu/homes/hanj/pdf/sigmod07_jglee.pdf>>, ACM, SIGMOD 2007, 2007, pp. 1-12.

Lee, et al., "Trajectory Outlier Detection: A Partition-and-Detect Framework", retrieved on Aug. 4, 2009 at <<http://www.cs.uiuc.edu/homes/hanj/pdf/icde08_jaegil_lee.pdf>>, IEEE Computer Society, ICDE 2008, 2008, pp. 1-10.

Lemire, Maclachlan, "Slope One Predictors for Online Rating-Based Collaborative Filtering", retrieved on Dec. 29, 2009 at <<http://www.daniel-lemire.com/fr/documents/publications/lemiremaclachlan_sdm05.pdf>>, SIAM Proceedings of Data Mining (SDM), 2005, pp. 1-5.

Li, et al., "A Connectivity-Based Map Matching Algorithm", AARS, Asian Journal of Geoinformatics, 2005, vol. 5, No. 3, pp 69-76.

Li et al., "Mining User Similarity Based on Location History", ACM Conference on Advances in Geographic Information Systems (ACM GIS 2008), Irvine, California, Nov. 5-7, 2008, Article 34, 10 pages, retrieved on Apr. 16, 2010 at <<http://research.microsoft.com/pubs/74369/Mining%20user%20similarity%20based%20on%20location%20history.pdf>>.

Li. et al., Temporal Outlier Detection in Vehicle Traffic Data, Proceedings of the 2009 IEEE International Conference on Data Engineering, pp. 1319-1322, <<http://www.cs.uiuc.edu/~hanj/pdf/icde09_xli.pdf>>.

Li, et al., "Traffic Density-Based Discovery of Hot Routes in Road Networks", Springer-Verlag, Advances in Spatial and Temporal Databases, 2007, pp. 441-459.

Liao et al., Anomaly Detection in GPS Data Based on Visual Analytics, Proceedings of the 2010 IEEE Symposium, Oct. 2010, pp. 51-58, <<http://web.siat.ac.cn/~baoquan/papers/GPSvas.pdf>>.

Liao, et al., "Building Personal Maps from GPS Data", retrieved on Aug. 4, 2009 at <<http://luci.ics.uci.edu/predeployment/websiteContent/weAreLuci/biographies/faculty/djp3/LocalCopy/JR-004.pdf>>, Proceedings of IJCAI MOO 2005, 2005, pp. 249-265.

Liao et al., "Learning and Inferring Transportation Routines", Elsevier, Artificial Intelligence, vol. 171, Issues 5-6, Apr. 2007, pp. 311-331.

Liao, et al. "Learning and inferring transportation routines", Artificial Intelligence, vol. 171, 2007, pp. 311-331.

Liao et al., "Learning and Inferring Transportation Routines", American Association for Artificial Intelligence Press (AAAI) 19th National Conference on Artificial Intelligence, San Jose, California, Jul. 25-29, 2004, pp. 348-353, retrieved on Apr. 16, 2010 at <<http://www.cs.rochester.edu/~kautz/papers/gps-tracking.pdf>>.

Liao et al., "Location-based Activity Recognition", Proceedings of the 19th Annual Conference on Neural Information Processing Systems (NIPS-2005), Whistler, British Columbia, Canada, Dec. 5-10, 2005, 8 pages, retrieved on Apr. 16, 2010 at <<http://books.nips.cc/papers/files/nips18/NIPS2005_0773.pdf>>.

Linden et al, "Amazon.com Recommendations, Item to Item Collaborative Filtering", IEEE Internet Computing, Jan. and Feb. 2003, 5 pgs.

Linden, "The End of Federated Search?", at <<http://glinden.blogspot.com/2007/03/end-of-federated-search.html>>, Mar. 24, 2007, pp. 9.

Saltenis, "Outlier Detection Based on the Distribution of Distances between Data Points", retrieved on Dec. 12, 2008 at <<http://www.mii.lt/informatica/pdf/INFO558.pdf>>, INFORMATICA, vol. 15, No. 3, 2004, pp. 399-410.

Salton, "Dynamic Document Processing", Communications of the ACM, vol. 15, Issue 7, Jul. 1972, pp. 658-668.

Salzberg et al., "Comparison of Access Methods for Time-Evolving Data", ACM Computing Surveys, 31(2), 1999, pp. 158-221, 64 pages.

Sarwar et al, "Application of Dimensionality Reduction in Recommender System, A Case Study", ACM WebKDD Workshop, Aug. 2000, 12 pgs.

Schofield, "It's GeoLife, Jim, But Not as we Know it", Guardian News, Retrieved on Nov. 28, 2011 at <<http://www.guardian.co.uk/technology/2008/mar/13/microsoft.research/print>>, Mar. 12, 2008, 2 pgs.

Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behaviour Research, Aug. 10-15, 2003, pp. 1-32.

Sellen, et al., "Do Life-Logging Technologies Support Memory for the Past? An Experimental Study Using SenseCam", available at least as early as Nov. 16, 2007, at <<http://research.microsoft.com/sds/papers/SensecamMemCHICamRdy.pdf>>, pp. 10.

Shachtman, Noah, "A Spy Machine of DARPA's Dreams," retrieved at <<http://archive.wired.com/techbiz/media/news/2003/05/58909?currentPage=all>>, Wired, May 20, 2003, 1 page.

Shachtman, Noah, "Pentagon Kills Lifelog Project," retrieved at <<http://www.wired.com/2004/02/pentagon-kills-lifelog-project/>>, Wired, Feb. 4, 2004, 6 pages.

"Share My Routes", retrieved on Apr. 15, 2010 at <<http://www.sharemyroutes.com/>>, 2010, pp. 1-2.

Shekhar et al., "A Unified Approach to Detecting Spatial Outliers", GeoInformatica, vol. 7, Issue 2, Jun. 2003, 28 pages.

(56) References Cited

OTHER PUBLICATIONS

Shekhar, et al., "Data Mining for Selective Visualization of Large Spatial Datasets", In the Proceedings of the 14th IEEE International Conference on Tools with Artificial Intelligence, Nov. 2002, pp. 41-48.

Shekhar, et al., Unified approach to detecting spatial outliers, University of Helsinki 2007, 27 pages, <<http://www.cs.helsinki.fi/u/leino/opetus/spatial-k07/maksimainen.pdf>>.

Sherkat, Rafiei, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 24, 2008, pp. 896-908.

Shiraishi, "A User-Centric Approach for Interactive Visualization and mapping of Geo-sensor Data", Networked Sensing Systems, 2007, INSS, Fourth International Conference on IEEE, Jun. 1, 2007, pp. 134-137.

Shklovski, et al., Urban Computing-Navigating Space and Context. IEEE Computer Society. 39 ,9, pp. 36-37, 2006 <<http://www.itu.dk/people/irsh/pubs/UrbanComputingIntro.pdf>>.

Simon, Frohlich, "A Mobile Application Framework for the geospatial Web", retrieved on Apr. 16, 2010 at <<http://www2007.org/papers/paper287.pdf>>, ACM, Proceedings of World Wide Web Conference (WWW), May 8, 2007, pp. 381-390.

Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658, retrieved on Apr. 30, 2010 at <<http://www.cs.cmu.edu/~ggordon/CMU-ML-08-109.pdf>>.

"SlamXR List Routes Page By Microsoft Research Community Technologies Group", retrieved on Jan. 18, 2008 from <<http://www.msslam.com/slamxr/ListRoutes.aspx>, 2 pages.

Sohn, et al., "Mobility Detection Using Everyday GSM Traces", retrieved on Aug. 4, 2009 at <<http://www.placelab.org/publications/pubs/mobility-ubicomp2006.pdf>>, UBICOMP 2006, 2006, pp. 212-224.

Song et al., "Hashing Moving Objects," Proceedings of 2nd International Conference of Mobile Data Management, 2001, pp. 1-31.

Song et al., "SEB-tree: An Approach to Index Continuously Moving Objects," Proceedings of International Conference of Mobile Data Management, pp. 340-344, Jan. 2003.

Spertus et al, "Evaluating Similarity Measures: A Large Scale Study in the Orkut Social Network", Proc 11th ACM SIGKDD Intl Conf on Knowledge Discovery in Data Mining, Aug. 2005, 7 pgs.

Spinellis, "Position-Annotated Photographs: A Geotemporal Web", IEEE Pervasive Computing IEEE Service Center, Los Alamintos, CA, vol. 2, No. 2, Apr. 1, 2003, pp. 72-79.

"SportsDo", retrieved on Jan. 17, 2008 from <<http://sportsdo.net/Activity/ActivityBlog.aspx>>, 3 pages.

Srebro et al., "Weighted Low-Rank Approximations", Proceedings of the 20th International Conference on Machine Learning (ICML-2003), Washington, DC, Aug. 21-24, 2003, 8 pages, retrieved on Apr. 30, 2010 at <<http://people.scail.mit.edu/tommi/papers/SreJaa-icml03.pdf>>.

Strachan, et al., "gpsTunes Controlling Navigation via Audio Feedback", Proceedings of MobileHCI, Sep. 2005, 4 pages.

Sui, "Decision Support Systems Based on Knowledge Management", Proceedings of the International Conference on Services Systems and Services Management (ICSSSM'05), Jun. 2005, vol. 2, pp. 1153-1156.

Sun, et al., On Local Spatial Outliers, Technical Report No. 549, Jun. 2004, <<http://sydney.edu.au/engineering/it/research/tr/tr549.pdf>>, 9 pages.

Sun, "Outlier Detection in High Dimensional, Spatial and Sequential Data Sets", School of Information Technologies, The University of Sydney, Sep. 2006, 118 pages.

Supplemental EP Search Report App. No. 09713700.4 dated Jul. 17, 2012, 9 pages.

Tai et al., "Recommending Personalized Scenic Itinerary with Geo-Tagged Photos", ICME, 2008, 2008 IEEE Intl Conf on Multimedia and Expo, Apr.-Jun. 2008, 4 pages.

Takeuchi et al., "City Voyager: An Outdoor Recommendation System Based on User Location History", Proceedings 0f the 3rd International Conference on Ubiquitous Intelligence and Couputing (UIC 2006), Wuhan, China, Sep. 3-6, 2006, pp. 625-636.

Takeuchi et al., "An Outdoor Recommendation System Based on User Location History", Proceedings of the 1st International Workshop on Personalized Context Modeling and Management for UbiComp Applications (ubiPCMM 2005), Tokyo, Japan Sep. 11, 2005, pp. 91-100, retrieved on Apr. 16, 2010 at <<http://docs.google.com/viewer?a=v&q=cache:YIN-lnGZcXMJ:citeseerx.ist.psu.edu/viewdoc/download%3Fdoi%3D10.1.1.91.813%26rep%3Drep1%26type%3Dpdf+An+outdoor+recommendation+system+based+on+user+location >>.

Tao et al., "MV3R-Tree: A Spatio-Temporal Access Method for Timestamp and Interval Queries," Proceedings of the International Conference on Very Large Data Bases, 2001, 10 pages.

Taylor, et al., "Virtual Differential GPS & Road Reduction Filtering by Map Matching", In the Proceedings of ION'99, Twelfth International Technical Meeting of the Satellite Division of the Institute of Navigation, 1999, pp. 1675-1684.

Tezuka, et al., "Toward Tighter Integration of Web Search with a Geographic Information System", WWW2006, May 2006, 10 pages Theodoridis et al., "On the Generation of Spatiotemporal Datasets," Advances in Spatial Databases, 6th International Symposium, Lecture Notes in Computer Science, Springer, 1999, 19 pages.

Theodoridis, et al., "Spatio-Temporal Indexing for Large Multimedia Applications", Proceedings of the IEEE International Conference on Multimedia Systems, Jun. 1996, 9 pages.

Theodoridis, et al., "Specifications for Efficient Indexing in Spatiotemporal Databases", Proceedings of the SDDBM'98, Jul. 1998, 10 pages Toyama, et al., "Geographic Location Tags on Digital Images", MM'03, Nov. 2003, 11 pages.

Tsoukatos, et al., "Efficient Mining of Spatiotemporal Patterns", Proceedings of the 7th International Symposium on Spatial and Temporal Databases LNCS 2121, Redondo Beach, CA, Jul. 12-15, 2001, pp. 425-442.

"Twittervision", retrieved on Jan. 18, 2008 from <<http://twittervision.com>>, 1 page.

Vlachos, Kollios, Gunopulos, "Discovering Similar Multidimensional Trajectories", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.106.1984%26rep%3Drep1%26type%3Dpdf&rct=j&q=Discovering+similar+multidimensional+trajectories&ei=ivfGS6HCM4uj_ga3wQiBDQ&usg=AFQjCNG20j6K3s_WuY-VhWeDjIPYpgxv1Q>>, IEEE Computer Society, Proceedings of Conference on Data Engineering (ICDE), 2002, pp. 673-684.

Wang et al., "A Flexible Spatio-Temporal Indexing Scheme for Large-Scale GPS Track Retrieval," MDM '08 9th International Conference on Mobile Data Management, IEEE, Beijing, 8 pages.

Wang et al., "An Optimized Location-based Mobile Restaurant Recommend and Navigation System", WSEAS Transactions on Information Science and Applications, vol. 6, Issue 5, May 2009, pp. 809-818, retrieved on Apr. 16, 2010 at <<http://www.wseas.us/e-library/transactions/information/2009/29-186.pdf>>.

Wang, et al., "CLOSET+: Searching for the Best Strategies for Mining Frequent Closed Itemsets", retrieved on Aug. 4, 2009 at <<http://www.cs.umd.edu/~samir/498/wang03closet.pdf>>, ACM, SIGKDD 2003, 2003, pp. 236-245.

Wang et al., "Spatiotemporal Data Modelling and Management: a Survey", Technology of Object-Oriented Languages and Systems, 2000, ASI, Proceedings of the 36th International Conference on Oct. 30-Nov. 4, 2000, IEEE, pp. 202-211.

Wang et al., "Unifying User-based adn Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508, retrieved on Apr. 30, 2010 at <<http://ict.ewi.tudelft.nl/pub/un/sigir06_similarityfuson.pdf>>.

(56) References Cited

OTHER PUBLICATIONS

Abowd et al., "Cyberguide: a mobile context-aware tour guide", Wireless Networks, vol. 3, retrieved on Apr. 30, 2010 at <<http://graphics.cs.columbia.edu/courses/mobwear/resources/p421-abowd-97.pdf>>, Oct. 1997, pp. 421-433.
Adomavicius, Tuzhilin, "Toward the Next Generation of Recommender Systems: A Survey of the State-of-the-Art and Possible Extensions", retrieved on Dec. 29, 2009 at <<http://www.inf.unibz.it/~ricci/ATIS/papers/state-of-the-art-2005.pdf>>, IEEE Transactions on Knowledge and Data Engineering, vol. 17, No. 6, Jun. 2005, pp. 734-749.
Agarwal, et al., "Geometric Approximation via Coresets," Combinatorial and Computational Geometry, MSRI Publications, vol. 52, 2005, 30 pages.
Agrawal, et al., "Efficient Similarity Search in Sequent Databases," IBM Almaden Research Center, San Jose, California, 4th International Conference, Oct. 1993, 15 pages.
Agrawal, et al., "Mining Association Rules between Sets of Items in Large Databases", retrieved on Aug. 4, 2009 at <<http://rakesh.agrawal-family.com/papers/sigmod93assoc.pdf>>, ACM, Proceedings of SIGMOD 1993, Jun. 1993, pp. 207-216.
Agrawal, et al., "Mining Sequential Patterns", retrieved on Aug. 4, 2009 at <<http://www.almaden.ibm.com/cs/projects/iis/ndb/Publications/papers/icde95.ps.gz>>, Proceedings of ICDE 1995, Mar. 1995, 12 pgs.
Ahem, et al., "World Explorer: Visualizing Aggregate Data From Unstructured Text in Geo-Referenced Collections", In the Proceedings of the 7th ACM/IEEE-CS Joint Conference on Digital Libraries, Jun. 2007, pp. 1-10.
Aizawa, et al., "Capture and Efficient Retrieval of Life Log", available at least as early as Nov. 16, 2007, at <<http://www.ii.ist.i.kyoto-u.ac.jp/~sumi/pervasive04/program/Aizawa.pdf>>, In Pervasive 2004 Workshop on Memory and Sharing of Experiences, Apr. 2004, 6 pgs.
Aizawa, "Digitizing Personal Experiences: Capture and Retrieval of Life Log", at <<http://ieeexplore.ieee.org/el5/9520/30168/01385968.pdf?arnumber=1385968 >>, Proceedings of the 11th International Multimedia Modelling Conference (MMM'05), Jan. 2005, pp. 1 (abstract).
Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, 2007, pp. 50.
Amato, et al., "Region Based Image Similarity Search Inspired by Text Search", Third Italian Research Conference on Digital Library Systems, Padova, Italy, Jan. 29-30, 2007, pp. 78-85.
Ankerst et al., "OPTICs: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages.
Ashbrook,et al., "Using GPS to Learn Significant Locations and Predict Movement Across Multiple Users", Journal of Personal and Ubiquitous Computer Archive, vol. 7, Issue 5, Oct. 2003, 15 pages.
Belussi, et al, "Estimating the Selectivity of Spatial Queries Using the 'Correlation' Fractal Dimension", retrieved on Apr. 15, 2010 at <<http://www.vldb.org/conf/1995/P299.PDF>>, Proceedings of Conference on Very Large Data Bases (VLDB), Sep. 1995, pp. 299-310.
"Bikely", retrieved on Apr. 15, 2010 at <<http://www.bikely.com/>>, 2010, pp. 1.
bing.com, Maps, Retrieved on Dec. 28, 2009 at <<http://cn.bing.com/ditu/>>, 2 pgs.
Blandford, Rafe, "Looking at Lifeblog," retrieved at <<http://www.allaboutsymbian.com/features/item/Looking_at_Lifeblog.php>>, Oct. 18, 2004, 14 pages.
Bohm, "A Cost Model for Query Processing in High Dimensional Data Spaces", retrieved on Apr. 15, 2010 at <<http://www.dbs.informatik.uni-muenchen.de/~boehm/publications/tods-modeling.final.pdf>>, ACM Transactions on Database Systems, Jun. 2000, pp. 1-43.

Borzsonyi, et al., The Skyline Operator, In Proc. ICDE 2001, IEEE Press: 421-430, <<http://ieeexplore.ieee.org/stamp/stamp.jsp?tp=&arnumber=914855>>.
Brakatsoulas, et al., "On Map-Matching Vehicle Tracking Data", VLDB Endowment, In the Proceedings of the 31st International Conference on Very Large Data Bases, Sep. 2005, pp. 853-864.
Brauckhoff, et al., Applying PCA for Traffic Anomaly Detection: Problems and Solutions, IEEE, Apr. 2009, 5 pages.
Breiman, "Bagging Pedictors", Machine Learning, vol. 24, No. 2, Aug. 1996, pp. 123-140.
Brkic, et al., Generative modeling of spatio-temporal traffic sign trajectories, Proceedings of the IEEE Conference on Computer Vision and Pattern Recognition, Jun. 2010, pp. 25-31, <<http://www.zemris.fer.hr/~ssegvic/pubs/brkic10ucvp.pdf>>.
Brunato, Battiti, "A Location-Dependent Recommender System for the Web", retrieved on Dec. 29, 2009 at <<http://dit.unitn.it/~brunato/pubblicazioni/MobEA.pdf>>, MobEA Workshop, Budapest, May 2003, pp. 1-5.
Bu, et al., "Efficient Anomaly Monitoring Over Moving Object Trajectory Streams", KDD Jun. 2009, ACM, 2009, 9 pages.
Cai, "Indexing Spatio-Temporal Trajectories with Chebyshev Polynomials", retrieved on Apr. 15, 2010 at <<http://www.cs.ubc.ca/~mg/psdepository/sigmod2004.pdf>>, ACM, Conference on Management of Data, Jun. 13-18, 2004, pp. 599-610.
Cao, et al., "Mining Frequent Spatio-temporal Sequential Patterns", retrieved on Aug. 4, 2009 at <<http://i.cs.hku.hk/~nikos/icdm05.pdf>>, IEEE Computer Society, ICDM 2005, Nov. 2005, pp. 82-89.
Carter, et al., "When Participants Do the Capturing: The Role of Media in Diary Studies," CHI 2005: 899-908, 10 pages.
Chakka, et al., "Indexing Large Trajectory Data Sets With SETI*," Proceedings of the 2003 CIDR Conference, pp. 1-12.
Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEEE Computer Society, Proceedings of Conference on Data Engineering (ICDE), Mar. 1999, pp. 126-133.
Chawathe, "Segment-Based Map Matching", In the Proceedings of the IEEE Intelligent Vehicles Symposium, Jun. 13-15, 2007, pp. 1190-1197.
Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.
Chen, et al., "GeoTracker Geospatial and Temporal RSS Navigation", WWW2007, May 2007, pp. 41-50.
Chen, et al., GLS-SOD: A Generalized Local Statistical Approach for Spatial Outlier Detection, Proceedings of KDD Jul. 2010, ACM, 2010, pp. 1069-1078.
Chen, et al, "On the Marriage of Lp-norms and Edit Distance", retrieved on Apr. 15, 2010 at <<http://www.google.co.in/url?sa=t&source=web&ct=res&cd=3&ved=0CBEQFjAC&url=http%3A%2F%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp-norms+and+edit+distance&ei=_ezGS62IE439_Aa1qtzZDA&usg=AFQjCNHFZScVkE4uy1b_oC-Pr4ur7KIBdQ>>, Proceedings of Conference on Very Large Data Bases (VLDB), Aug. 29-Sep. 3, 2004, pp. 792-803.
Chen, et al, "Robust and Fast Similarity Search for Moving Object Trajectories", retrieved on Apr. 15, 2010 at <<http://citeseerx.ist.psu.edu/viewdock/download;jsessionid=2C0EAC347F5F144727996F29CEFD49FB?doi=10.1.1.94.8191&rep=rep1&type=pdf>>, ACM, Conference on Management of Data, Jun. 2005, pp. 491-502.
Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, 12 pages, retrieved on Apr. 16, 2010 at <<http://www.itee.uq.edu.au/~zxf/_papers/sigmod299-chen.pdf>>.
Cranshaw, et al., Bridging the Gap between the Physical Location and Online Social Networks, In Proc. Ubicomp Sep. 2010, ACM Press (2010), <<http://www.eng.tau.ac.il/~eran/papers/Cranshaw_Bridging_the_Gap_pdf>>.

(56) References Cited

OTHER PUBLICATIONS

"CRF++: Yet Another CRF Toolkit", retrieved on Jan. 18, 2008 from <<http://crfpp.sourceforge.net>>, 13 pages.
Das, et al., Anomaly Detection and Spatial-Temporal Analysis of Global Climate System, Proceedings of SensorKDD 2009, 9 pages, 2009 ACM.
Datta, et al., "Image Retrieval: Ideas, Influences, and Trends of the New Age", ACM Computing Surveys, vol. 40, No. 2, Article 5, Apr. 2008, pp. 1-60.
Deerwester, et al., "Indexing by Latent Semantic Analysis", J. Amer. Soc. Info. Sci., vol. 41, No. 6, Jan. 1990, 34 pages.
Ding et al, "Querying and Mining of Time Series Data: Experimental Comparison of Representations and Distance Measures", retrieved on Apr. 15, 2010 at <<http://www.vldb.org/pvldb/1/1454226.pdf>>, VLDB Endowment, PVLDB'08, Aug. 23-28, 2008, pp. 1542-1552.
Domain Name System (DNS), retrieved on Apr. 29, 2008 at <<http://www.unix.org.ua/orelly/networking/firewall/ch08_10.htm>>, Unix, pp. 1-11.
Domain Name System (DNS) a Guide to TCP/IP, retrieved Apr. 29, 2008 at <<http://web.syr.edu/~djmolta/ist452/ch_07.ppt>>, Thomson Learning Course Technology, pp. 1-56.
Dubuisson et al., "A Modified Flausdorff Distance for Object Matching", Proceedings of the 12th IAPR International Conference on Pattern Recognition, Computer Vision & Image Processing, vol. 1, Oct. 9-13, 1994, pp. 566-568.
Dumais, et al., "Stuff I've Seen: A System for Personal Information Retrieval and Re-Use," SIGIR, Aug. 1, 2003, pp. 1-8.
Eagle, et al., "Community Computing: Comparisons between Rural and Urban Societies using Mobile Phone Data", IEEE Social Computing, Aug. 2009, 144-150, 7 pages, available at <<http://reality.media.mit.edu/pdfs/Eagle_community.pdf>>.
Eagle et al, "Reality mining: sensing complex social systems", Springer-Verlag London, Personal and Ubiquitous Computing, vol. 10, Issue 4, Mar. 2006, pp. 255-268.
The European Search Report dated Nov. 21, 2012 for European patent application No. 09714738.3, 9 pages.
The European Search Report dated Jun. 8, 2012 for European patent application No. 09715263.01, 6 pages.
Espinoza et al, "GeoNotes: Social and Navigational Aspects of Location-Based Information Systems", Proc Ubicomp 3rd Intl Conf on Ubiquitous Computing, Oct. 2001, LNCS 2201, 16 pgs.
Estivill-Castro et al, "Data Mining Techniques for Autonomous Exploration of Large Volumes of Geo-referenced Crime Data", 6th International Conference on GeoCom.putation, University of Queensland, Brisbane, Australia, Sep. 24-26, 2001, 12 pages.
Estkowski, No Steiner Point Subdivision Simplification is NP-Complete, In Proceedings of the 10th Canadian Conference on Computational Geometry, pp. 11-20, Jun. 30, 1998.
Eustice et al, "The Smart Party: A Personalized Location Aware Multimedia Experience", Consumer Communications and Networking Conf, Jan. 2008, 5 pgs.
Faloutsos, Ranganathan, Manolopoulos, "Fast Subsequence Matching in Time-Series Databases", retrieved on Apr. 15, 2010, available at <<https://pdfs.semanticscholar.org/ed82/8357ecf4a752e11e9233c6f7ec1bff5a634d.pdf>> ACM SIGMOD Record, vol. 23, No. 2, Jun. 1994, pp. 419-429, 32 pages.
Flickr, http://www.flickr.com/, retrieved on Jan. 18, 2008, 1 page.
"Flow Control Platform (FCP) Solutions", retrieved Jul. 5, 2007 at <<http://k2colocation.com/network-services/fcp.cfm>>, K2 Colocation, 2005, pp. 2.
Freeman, Eric, "Lifestreams: A Storage Model for Personal Data," SIGMOD Record, vol. 25, No. 1, Mar. 1996, pp. 80-86.
Frentzos et al, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, Jun. 2007, pp. 1-32.
Frentzos et al, "Index-based Most Similar Trajectory Search", retrieved on Apr. 15, 2010 at <<http://isl.cs.unipi.gr/pubs/TR/UNIPI-ISL-TR-2006-01.pdf>>, IEEE Conference on Data Engineering (Technical Report UNIPI-ISL-TR-2006-01), Jun. 2006, pp. 1-12.
Fu, et al., "Heuristic shortest path algorithms for transportation applications: State of the art," Science Direct, Computers & Operations Research 33 (2006) 3324-3343, available May 3, 2005; pp. 3324-3343.
Ge, et al., An Energy-Efficient Mobile Recommender System. In Proc. KDD Jul. 2010, ACM Press 2010, <<http://pegasus.rutgers.edu/~kelixiao/papers/An%20Energy-Efficient%20Mobile%20Recommender%20System.pdf>> 9 pages.
Ge, et al., TOP-EYE: Top-k Evolving Trajectory Outlier Detection, Proceedings of CIKM Oct. 2010, Toronto, Canada, 4 pages.
Geek Magazine, "LifeLog: DARPA looking to record lives of interested parties," retrieved at <<http://www.geek.com/news/lifelog-darpa-looking-to-record-lives-of-interested-parties-5528791>>, retrieved on Sep. 23, 2013, published on Jun. 3, 2003, 4 pages.
Gemmell, et al., "MyLifeBits: A Personal Database for Everything," Microsoft Bay Area Research Center, MSR-TR-2006-23, Feb. 20, 2006, pp. 1-18.
GeoLife GPS Trajectories, "User Guide", retrieved at<<http://research.microsoft.com/en-us/downloads/b16d359d-d164-469e-9fd4-daa38f2b2e13/default.aspx>> Aug. 1, 2012, 5 pages.
Giannotti, et al., "Efficient Mining of Temporally Annotated Sequences", retrieved on Aug. 4, 2009 at <<http://www.siam.org/meetings/sdm06/proceedings/032giannottif.pdf>>, Proceedings of the Sixth SIAM Intl Conference on Data Mining, Apr. 2006, pp. 346-357.
Giannotti, et al., "Trajectory Pattern Mining", retrieved on Aug. 4, 2009 at <<http://cs.gmu.edu/~jessica/temp/p330-giannotti.pdf>>, ACM, KDD'07, Aug. 2007, pp. 330-339.
"Global Server Load Balancing for Disaster Recovery, Business Continuity, Performance Optimization and Datacenter Management", retrieved Jul. 6, 2007 at <<http://www.zeus.com/documents/en/ZXT/ZXTM_Global_Load_Balancer.pdf>>, Zeus Technology Limited, 1995-2007, pp. 4.
Goldberg, et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pgs.
Gonzalez, et al., "Adaptive Fastest Path Computation on a Road Network: A Traffic Mining Approach", ACM, In the Proceedings of the 33rd International Conference on Very Large Data Bases, Sep. 23-28, 2007, pp. 794-805.
Gonzalez, Hidalgo, Barabasi, "Understanding individual human mobility patterns Supplementary Material", retrieved on Dec. 29, 2009 at <<http://www.barabasilab.com/pubs/CCNR-ALB_Publications/200806-05_Nature-MobilityPatterns/200806-05_Nature-MobilityPatterns-SuppMat13.pdf>>, Nature, vol. 453, 2008, pp. 779-782.
GPS Sharing, retrieved Feb. 4, 2013 at http://web.archive.org/web/20071129224158/http://gpssharing.com, 2 pgs.
"GPS Track Route Exchange Forum", 2010 GPSXchange.com website, 3 pages, retrieved on Apr. 16, 2010 at <<http://www.gpsxchange.com/phpBB2/index.php>>.
"GPS-Waypoints", retrieved on Apr. 15, 2010 at <<http://www.gps-waypoints.net/>>, 2010, pp. 1.
Graham, "GPS Gadgets Can Reveal More Than Your Location", Retrieved on Nov. 28, 2011 at <<http://www.google.com/#sclient=psy-ab&hl=en&source=hp&q=Graham%2C+GPS+Gadgets+Can+Reveal+More+Than+Your+Location&pbx=1&oq=Graham%2C+GPS+Gadgets+Can+Reveal+More+Than+Your+Location%22%2C+&aq=f&aqi=&aql=&gs_sm=d&gs_upl=2870I6708I0I10140I2I2I0I0I0I0I266I438I0.1.1I2I0&bav=on.2,or.r_gc.r_pw.,cf.osb&fp=533a712cc6ce8ba0&biw=1280&bih=808>>, 2008, pp. 1-2.
Greenfeld, "Matching GPS Observations to Locations on a Digital Map", In the Proceedings of the 81st Annual Meeting of the Transportation Research Board, Washington DC, Jan. 2002, 13 pgs.
Guehnemann, et al., Monitoring traffic and emissions by floating car data. Institute of transport studies Australia; Mar. 2004, <<http://elib.dlr.de/6675/1/its_wp_04-07.pdf>> 13 pages.
Gustavsen, "Condor—an application framework for mobility-based context-aware applications", retrieved on Aug. 4, 2009 at <<http://

(56) References Cited

OTHER PUBLICATIONS www.comp.lancs.ac.uk/~dixa/conf/ubicomp2002-models/pdf/Gustavsen-goteborg%20sept-02.pdf>>, UBICOMP 2002, 2002, pp. 1-6.

Gutman, "Reach-Based Routing: A New Approach to Shortest Path Algorithms Optimized for Road Networks", In the Proceedings of the Sixth Workshop on Algorithm Engineering and Experiments and the First Workshop on Analytic Algorithmics and Combinatorics, New Orleans, LA, USA, Jan. 10, 2004, 12 pgs.

Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.66.1675%26rep%3Drep1%26type%3Dpdf&rct=j&q=R-trees%3A+a+dynamic+index+structure+for+spatial+searching&ei=JfTGS6uRPJH0_AaCplCHDQ&usg=AFQjCNFtQttNVHCKYJQZcH052-KmCxlZ0g>>, ACM, Proceedings of Conference on Management of Data,1984, pp. 47-57. 11 pages.

Hadjieleftheriou, et al., "Complex Spatio-Temporal Pattern Queries", Proceedings of the 31st VLDB Conference, Sep. 2005, pp. 877-888.

Hadjieleftheriou, et al., "Efficient Indexing of Spatiotemporal Objects", Proceedings of the 8th International Conference on Extending Database Technology: Advances in Database Technology, Mar. 2002, 10 pages.

Hadjieleftheriou, et al., "Indexing Spatio-temporal Archives," Proceedings of Extending Database Technology 2002, pp. 1-22.

Han, et al., "Frequent pattern mining: current status and future directions", retrieved on Aug. 4, 2009 at <<http://www.springerlink.com/content/9p5633hm18x55867/fulltext.pdf>>, Springer Science+Business Media, LLC, 2007, pp. 55-86.

Han, et al., "Predicting User' Movement with a Combination of Self-Organizing Map and Markov Model", ICANN 2006, Part II, LNCS 4132, Sep. 2006, pp. 884-893.

Hanlon, Mike, "Nokia Lifeblog is an automated multimedia diary," retrieved at <<http://www.gizmag.com/go/2729/>>, Jun. 4, 2004, 5 pages.

Hariharan et al, "NetTrust—Recommendation System for Embedding Trust in a Virtual Realm", ACM Recommender Systems, Oct. 2007, 6 pgs.

Hariharan, et al., "Project Lachesis: Parsing and Modeling Location Histories", ACM, In the Proceedings of GIScience, 2004, pp. 106-124.

Hart, et al., "A Formal Basis for the Heuristic Determination of Minimum Cost Paths", In the Proceedings of IEEE Transactions of Systems Science and Cybernetics, vol. 4, No. 2, Feb. 12, 2007 (First Publication 1968), pp. 100-107.

Hirose, et al., Network Anomaly Detection based on Eigen Equation Compression, In Proceedings of the 15th SIGKDD Conference on Knowledge Discovery and Data Mining, pp. 1185-1194, 2009 ACM. <<http://www.ibis.t.u-tokyo.ac.jp/yamanishi/ID361_Network_Anomaly_Detection.pdf>>.

Hjaltason, Samet, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, pp. 265-318.

Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, pp. 124-129.

Huang, Shekhar, Xiong, "Discovering Co-location Patterns from Spatial Datasets: A General Approach", retrieved on Dec. 29, 2009 at <<http://www.spatial.cs.umn.edu/paper_ps/coloc-tkde.pdf>>, IEEE Transactions on Knowledge and Data Engineering, vol. 16, Issue 12, Dec. 2004, pp. 1472-1485.

Huang, et al., "Project Report (draft version) Spatial Outlier Detection", retrieved on Dec. 12, 2008 at <<http://www-users.cs.umn.edu/~joh/csci8715/P6.pdf>>, Computer Science Department, University of Minnesota, 2004, pp. 1-8.

International Preliminary Report on Patentability for PCT Application No. PCT/US2009,032774, dated Aug. 31, 2010.

International Search Report and the Written Opinion for PCT Application No. PCT/US2009/032778, dated Aug. 19, 2009, 11 pgs.

Zheng, Li, Chen, Xie, Ma, "Understanding Mobility Based on GPS Data", retrieved on Dec. 29, 2009 at <<http://delivery.acm.org/10.1145/1410000/1409677/p312-zheng.pdf?key1=1409677&key2=0364712621&coll=GUIDE&dl=GUIDE&CFID=70433597&CFTOKEN=93582958>>, ACM Proceedings of Conference on Ubiquitous Computing (UbiComp), vol. 344, Sep. 21, 2008, pp. 312-321.

Zheng et al., "Understanding Transportation Modes Based on GPS Data for Web Applications," ACM Transactions on the Web, 4(1):1-36, 2010.

Zhou et al., "Close Pair Queries in Moving Object Databases," Proceedings of ACM GIS, pp. 2-11, 2005, 10 pages.

Ziebart, et al., Navigate like a cabbie: Probabilistic reasoning from observed context-aware behavior. In Proc. Ubicomp 2008, pp. 322-331, <<http://citeseerx.ist.psu.edu/viewdoc/download?doi=10.1.1.141.7187&rep=rep1&type=pdf>>.

Office action for U.S. Appl. No. 12/567,667, dated Feb. 25, 2014, Zheng et al., "Recommending Points of Interests in a Region", 31 pages.

Office action for U.S. Appl. No. 13/324,758, dated Feb. 26, 2016, Zheng et al., "Urban Computing of Route-Oriented Vehicles", 32 pages.

Office action for U.S. Appl. No. 12/353,940, dated Feb. 28, 2013, Zheng et al., "Detecting Spatial Outliers in a Location Entity Dataset", 9 pages.

Office Action for U.S. Appl. No. 13/195,496, dated Feb. 7, 2012, Yu Zheng, "Learning Transportation Modes from Raw GPS Data ", 7 pages.

Office Action for U.S. Appl. No. 12/041,599, dated Feb. 9, 2012, Arne Josefsberg, "Failover in an Internet Location Coordinate Enhanced Domain Name System", 27 pgs.

Office Action for U.S. Appl. No. 12/037,347, dated Mar. 1, 2011, Zheng, et al., System for Logging Life Experiences Using Geographic Cues, 18 pages.

Office action for U.S. Appl. No. 12/712,053, dated Mar. 10, 2015, Zheng et al, "Route Computation Based on Route-Oriented Vehicle Trajectories", 22 pages.

Office action for U.S. Appl. No. 12/794,538, dated Mar. 2, 2016, Zheng et al., "Searching Similar Trajectories by Locations", 10 pages.

Office Action for U.S. Appl. No. 12/353,940, dated Mar. 23, 2012, Yu Zheng, "Detecting Spatial Outliers in a Location Entity Dataset", 6 pgs.

Office action for U.S. Appl. No. 12/794,538, dated Mar. 23, 2015, Zheng et al., "Searching Similar Trajectories by Locations", 8 pages.

Office Action for U.S. Appl. No. 12/773,771, dated Mar. 26, 2012, Yu Zheng, "Collaborative Location and Activity Recommendations", 9 pgs.

Office Action for U.S. Appl. No. 12/711,130, dated Mar. 27, 2012, Yu Zheng, "Mining Correlation Between Locations Using Location History", 14 pgs.

Office Action for U.S. Appl. No. 12/037,263, dated Mar. 29, 2011, Longhao Wang, "Indexing Large-Scale GPS Tracks", 8 pages.

Office action for U.S. Appl. No. 12/194,538, dated Apr. 22, 2014, Zheng et al., "Searching Similar Trajectories by Locations", 38 pages.

Office action for U.S. Appl. No. 14/587,270, dated Apr. 8, 2016, Zheng et al., "Determine Spatiotemporal Causal Interactions in Data", 7 pages.

Office Action for U.S. Appl. No. 12/712,857, dated May 20, 2016, Yu Zheng, "Map-Matching for Low-Sampling-Rate GPS Trajectories", 14 pages.

Office action for U.S. Appl. No. 13/324,758, dated Jun. 17, 2015, Zheng et al, "Urban Computing of Route-Oriented Vehicles", 38 pages.

Office action for U.S. Appl. No. 14/659,125, dated Jun. 19, 2015, Inventor #1, "Recommending Points of Interests in a Region", 7 pages.

(56) References Cited

OTHER PUBLICATIONS

Non-Final Office Action for U.S. Appl. No. 12/041,608, dated Jun. 25, 2014, Josefsberg, et al., "Client-Side Management of Domain Name Information", 4 pages.
Office action for U.S. Appl. No. 12/712,857, dated Jun. 25, 2015, Inventor #1, "Map-Matching for Low-Sampling-Rate GPS Trajectories", 17 pages.
Office Action for U.S. Appl. No. 12/712,857, dated Jun. 6, 2014, Yu Zheng, "Map-Matching for Low-Sampling-Rate GPS Trajectories", 14 pages.
Office action for U.S. Appl. No. 12/112,053, dated Jun. 6, 2014, Zheng et al., "Route Computation Based on Route-Oriented Vehicle Trajectories", 24 pages.
Office action for U.S. Appl. No. 13/324,758, dated Jul. 11, 2013, Zheng et al., "Urban Computing of Route-Oriented Vehicles", 47 pages.
Office Action for U.S. Appl. No. 13/324,758, dated Jul. 13, 2016, Zheng et al., "Urban Computing of Route-Oriented Vehicles", 7 pages.
Office Action for U.S. Appl. No. 12/353,940, dated Jul. 17, 2014, Yu Zheng, "Detecting Spatial Outliers in a Location Entity Dataset", 10 pages.
Office Action for U.S. Appl. No. 12/567,667, dated Jul. 18, 2012, Zheng et al., "Recommending Points of Interests in a Region", 20 pages.
Office action for U.S. Appl. No. 12/794,538, dated Aug. 14, 2015, Zheng et al., "Searching Similar Trajectories by Locations", 10 pages.
Office Action for U.S. Appl. No. 12/712,053, dated Aug. 15, 2012, Zheng et al., "Route Computation Based on Route-Oriented Vehicle Trajectories", 17 pages.
Office action for U.S. Appl. No. 12/194,538, dated Aug. 2, 2016, Zheng et al. "Searching Similar Trajectories by Locations", 7 pages.
Final Office Action for U.S. Appl. No. 12/567,667, dated Aug. 27, 2014, Yu Zheng, "Recommending Points of Interests in a Region", 7 pages.
Office action for U.S. Appl. No. 12/041,599, dated Sep. 21, 2012, Josefsberg et al., "Failover in an Internet Location Coordinate Enhanced Domain Name System", 9 pages.
International Preliminary Report on Patentability for PCT Application No. PCT/US2009/032778, dated Aug. 31, 2011.
Office Action for EP Patent Application No. 09 715 263.1, dated Feb. 16, 2015, "Learning Transportation Modes from Raw GPS Data", 5 pages.
Office Action dated Oct. 9, 2015 for European Patent Application No. 09 715 263.1, 4 pages.
Papadopoulos et al., "Performance of Nearest Neighbor Queries in R-Trees", In ICDT, 1997, pp. 394-408.
Park, et al., "CoDNS: Improving DNS Performance and Reliability via Cooperative Lookups", Proc 6th conf on Symposium on Operating Systems Design and Implementation, vol. 6, Dec. 2004, pp. 1-16.
Park et al., "Location-Based Recommendation System Using Bayesian User's Preference Model in Mobile Devices", J. Indulska et al. (Eds.): UIC 2007, LNCS 4611, pp. 1130-1139, retrieved on Apr. 30, 2010 at <<http://sclab.yonsel.ac.kr/publications/paper/IC/UIC07-MHPark.pdf>>.
Patterson, et al., "Inferring High-Level Behavior from Low-Level Sensors", Springer-Verlag Berlin Heidelberg, Lecture Notes in Computer Science, International Conference on Ubiquitous Computing, 2003, vol. 2864, pp. 73-89.
Patterson, et al., "Inferring High-Level Behavior from Low-Level Sensors", retrieved on Aug. 4, 2009 at <<http://www.cs.rochester.edu/u/kautz/papers/High-Level-140.pdf>>, UBICOMP 2003, 2003, pp. 1-18.
Pelekis, et al., Unsupervised Trajectory Sampling, Proceedings of the European Conference on Machine Learning and Principles and Practice of Knowledge Discovery in Databases ECML PKDD 2010, pp. 17-33, 2010.
Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406.
Pfoser, et al., "Capturing the Uncertainty of Moving-Object Representations", Springer-Verlag, In the Proceedings of the 6th International Symposium on Advances in Spatial Databases, Lecture Notes in Computer Science, 1999, vol. 1651, pp. 111-131.
Popivanov, et al., "Similarity Search Over Time-Series Data Using Wavelets", Proceedings of the 18th International Conference on Data Engineering (ICDE'02),IEEE Computer Society, San Jose, CA, Feb. 26-Mar. 1, 2002, 10 pages.
Quddus, et al."Current Map-Matching Algorithms for Transport Applications: State-of-the-Art and Future Research Directions", Elsevier Ltd., Transportation Research Part C: Emerging Technologies, 2007, vol. 15, Issue 5, pp. 312-328.
Rao et al., "Making B+-tree Cache Sensitive in Main Memory," Proceedings of ACM SIGMOD Conference, 2000, pp. 475-486, 12 pages.
Rekimoto, et al., "LifeTag: WiFi-based Continuous Location Logging for Life Pattern Analysis", retrieved on Aug. 4, 2009 at <<http://209.85.229.132/search?q=cache:fCil8hzKWxQJ.www.sonycsl.co.jp/person/rekimoto/papers/loca07.pdf+mining+individual+life+pattern+based+on+location+history&cd=5&hl=en&ct=clnk&gl=uk>>, LoCA 2007, 2007, pp. 35-49.
Ringberg, et al., Sensitivity of PCA for Traffic Anomaly Detection, SIGMETRICS 2007, pp. 109-120.
Rosenfeld, Connectivity in digital pictures, Journal of the ACM 17 (1): pp. 146-160, 1970.
Roussopoulos, Kelley, Vincent, "Nearest Neighbor Queries", retrieved on Apr. 15, 2010 at <<http://www.cs.umd.edu/~nick/papers/nncolor.pdf>>, ACM, Presentation: Conference on Management of Data, 1995, pp. 1-23.
Salton, et al., "A Vector Space Model for Automatic Indexing", Communications of the ACM, vol. 187, No. 11, Nov. 1975, pp. 613-620.

\* cited by examiner

POINTS ON THE TRAJECTORY TO GEOGRAPHICAL LOCATIONS

USER-SPECIFIED TRAVEL SEQUENCE ic services is being offered to users through web browsers, search engines, and as applications. Users may access the map-based services for street maps and a route planner for traveling by foot, vehicle, or public transport.
SEARCHING SIMILAR TRAJECTORIES BY LOCATIONS

CROSS-REFERENCE TO RELATED APPLICATION

This application is a divisional of, and claims priority to, commonly owned U.S. patent application Ser. No. 12/794,538, entitled "Searching Similar Trajectories by Locations," filed on Jun. 4, 2010, the entire contents of which are incorporated herein by reference.

BACKGROUND

A wide range of map-based services is being offered to users through web browsers, search engines, and as applications. Users may access the map-based services for street maps and a route planner for traveling by foot, vehicle, or public transport.

Requests for map-based services have become a common activity in people's daily lives. Many users access these services through a search engine on a computing device or on a personal navigation device. Users often request map-based services prior to driving to an appointment or an event at an unfamiliar location. However, conventional map-based services often determine routes solely with reference to a starting location to a destination location.

Other services, meanwhile, attempt to find user-requested routes using conventional trajectory searches. However, these trajectory map-based services often output planned routes that are based on a shape, a shape skeleton, a comparison, or other criteria. As such, these routes do not necessarily end precisely at a desired geographical location.

SUMMARY

This disclosure describes providing a trajectory route based on user input for multiple geographical locations. A trajectory route service receives global position system (GPS) logs (or other location-based logs) associated with respective devices, each of the GPS logs including trajectories connecting a set of geographical locations previously visited by an individual using a respective device. Next, a user requests a trajectory connecting a set of geographical locations of interest specified by the user. The trajectory route service calculates a proximal similarity between (1) the set of geographical locations of interest specified by the user, and (2) respective sets of geographical locations from the GPS logs. Based at least in part on the calculated proximal similarity, the trajectory route service constructs the requested trajectory with use of at least one of the trajectories from the GPS logs.

In another implementation, a trajectory route service receives a user input specifying multiple geographical locations of interest for planning a travel route. The trajectory route service accesses a trajectory route map constructed from GPS logs associated with respective individual devices, each of the GPS logs include trajectories that connect a set of geographical locations previously visited by an individual of a respective individual device. The trajectory route service computes an initial route by identifying trajectories from the GPS logs being closest in distance to each of the geographical locations of interest. The trajectory route service then refines the initial route by pruning and removing unqualified trajectories. The trajectory route service presents a route with a trajectory from the GPS logs that sequentially connects each of the multiple geographical locations of interest.

In yet another implementation, the trajectory route service receives a request for directions to multiple geographical locations and an order of travel to the multiple geographical locations. The trajectory route service presents a travel route in the order of travel, as specified by the user, to each of one or more geographical locations of interest.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes techniques for providing a travel route between a set of locations specified by a user. For instance, the user may desire to receive directions to a set of locations (e.g., locations A, B, and C), possibly without specifying a particular order of travel for the directions to these locations. After these desired locations are provided to a trajectory route service, the trajectory route service identifies an ideal route for travel to the multiple locations based in part on a travel sequence to the locations previously visited by individuals. To be able to provide the ideal route, the trajectory route service calculates a distance between the locations previously visited by individuals and the set of locations specified by the user. Thus, the trajectory route service presents the ideal route to the locations specified by the user based on the travel sequence from historical data.

In another implementation, the trajectory route service may further include an order of travel as specified by the user to one or more of multiple locations (e.g. locations A, B, and C). The user may desire directions starting at location A, travelling from location A to location C, and then travelling from location C to location B. For example, the user may want to view material at a new fabric store, attend a recital at a school, and meet friends for dinner at a restaurant that the user has not previously dined at. The trajectory route marks a travel route in the order as specified by the user, such as starting at location A, travelling from locations A to C, and travelling from locations C to B. Thus, the trajectory route service adjusts the travel sequence to each one of the locations of interest to satisfy the order of travel. The terms geographical locations of interest specified by the user and geographical locations of interest may be used interchangeably to describe the locations specified by the user.

As described herein, a trajectory route service constructs a trajectory or a travel route based on a relationship between global positioning system (GPS) trajectories and geographical locations of interest. The trajectory route service receives GPS logs associated with respective devices, each of the GPS logs including trajectories connecting a set of geographical locations previously visited by an individual of a respective device. The trajectory route service receives a request for a trajectory connecting the multiple geographical locations specified by a user. The trajectory route service calculates a proximal similarity between the set of geographical locations of interest specified by the user, and respective sets of geographical locations from the GPS logs.

While aspects of described techniques can be implemented in any number of different computing systems, environments, and/or configurations, implementations are described in the context of the following illustrative computing environment.

Illustrative Environment

Figure 1:
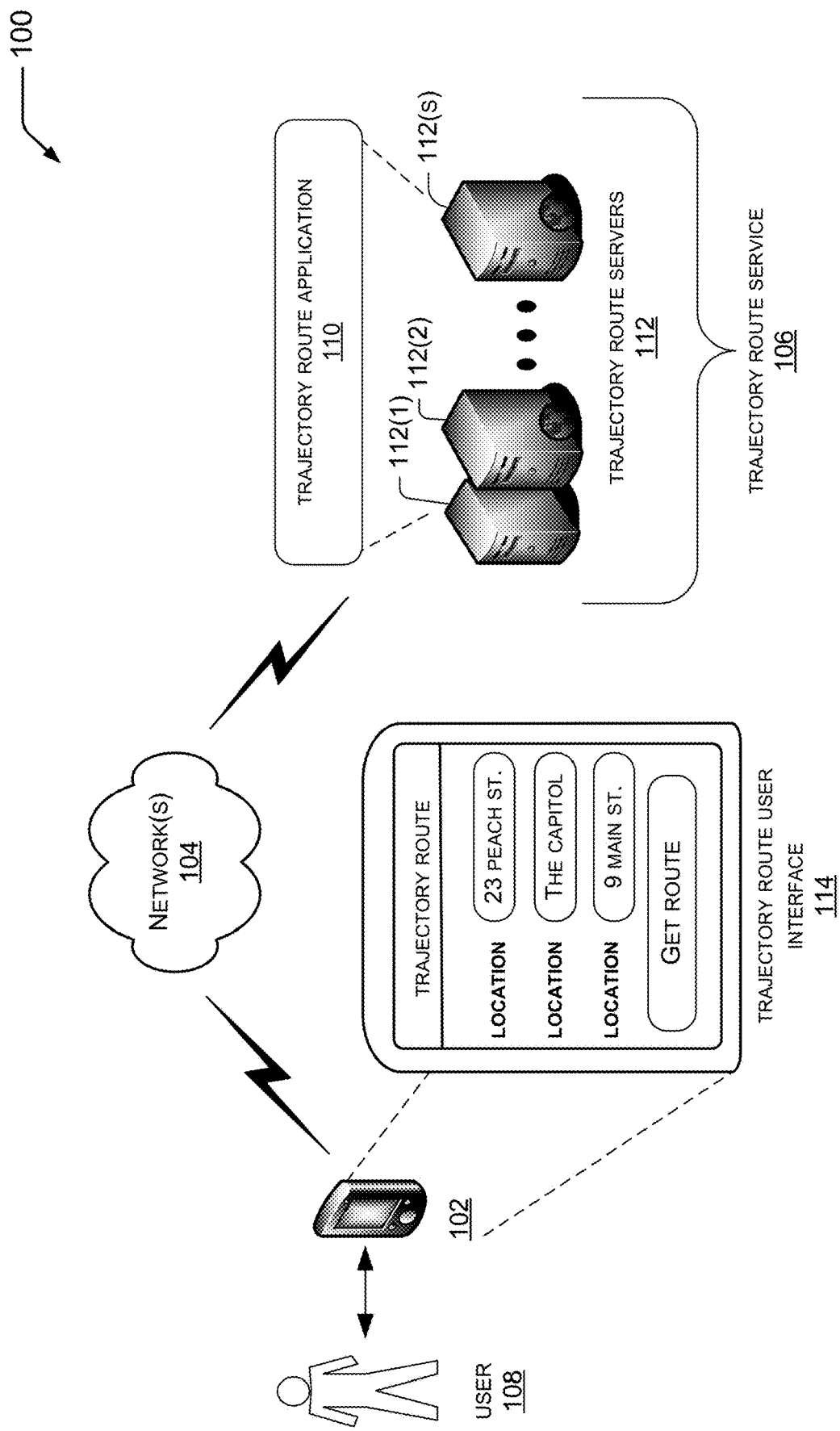
FIG. 1 illustrates an architecture to support an illustrative environment for providing a trajectory route to a user.

FIG. 1 illustrates an illustrative architectural environment 100 in which a trajectory or a travel route may be recommended for output on a computing device. The environment 100 includes an illustrative computing device 102, which is illustrated as a personal digital assistant (PDA). The computing device 102 is configured to connect via one or more network(s) 104 to access a trajectory route service 106 on behalf of a user 108. The computing device 102 may take a variety of forms, including, but not limited to, a portable handheld computing device (e.g., a personal digital assistant, a smart phone, a cellular phone), a personal navigation device, a laptop computer, a desktop computer, a portable media player, or any other device capable of connecting to one or more network(s) 104 to access the trajectory route service 106 for the user 108.

The network(s) 104 represents any type of communications network(s), including wire-based networks (e.g., public switched telephone, cable, and data networks) and wireless networks (e.g., cellular, satellite, WiFi, and Bluetooth).

The trajectory route service 106 represents an application service that may be operated as part of any number of online service providers, such as a search engine, a map service, a social networking site, or the like. Also, the trajectory route service 106 may include additional modules or work in conjunction with other modules to perform the operations discussed below. In an implementation, the trajectory route service 106 may be implemented at least in part by a trajectory route application 110 executed by trajectory route servers 112, or by a trajectory route application stored in memory of the computing device 102. Updates may be sent for the trajectory route application stored in memory of the computing device 102.

The trajectory route service 106 may be hosted on one or more trajectory route servers, such as server 112(1), 112(2), . . . , 112(S), accessible via the network(s) 104. The trajectory route servers 112(1)-(S) may be configured as plural independent servers, or as a collection of servers that are configured to perform larger scale functions accessible by the network(s) 104. The trajectory route servers 112 may be administered or hosted by a network service provider that provides the trajectory route service 106 to and from the computing device 102.

In the illustration, the computing device 102 includes a trajectory route user interface (UI) 114 that is presented on a display of the computing device 102. The trajectory route service 106, in operation with the trajectory route application 110, presents the UI 114 to receive user input and to present the trajectory or the travel route to the user 108. Thus, the UI 114 facilitates access to the trajectory route service 106 that provides the trajectory or the travel routes.

In an implementation, the UI 114 is a browser-based UI that presents a page received from the trajectory route service 106. The user 108 employs the trajectory route UI 114 when accessing the trajectory route service 106 to find a map for a particular region. In an implementation, the UI 114 may allow the user 108 to select one or more geographical locations of interest on the particular region in the map by clicking on these locations. In response, the trajectory service may determine a best trajectory amongst these locations, as discussed in detail below.

In another implementation, the trajectory route service 106, in operation with the trajectory route application 110, presents the UI 114 to receive textual or aural input from the user 108. For instance, the user 108 may type one or more geographical locations of interest and, in response, the trajectory service may determine a best trajectory amongst these locations. In the illustrated example, the user 108 may input multiple geographical locations of interest without any travel order in which the user would like to visit these locations. For example, the UI 114 illustrates a location of "23 Peach St.," another location identified by its landmark name such as "The Capitol," and another location "9 Main St." The trajectory route service 106 provides the trajectory or the travel route based on the trajectories from the GPS logs that are closest to each one of the geographical locations of interest, identified by a street name, a landmark name, or a specific point location that is of use or of interest to the user 108. The geographical location of interest or the specific point location may include but is not limited to a type of a location, such as a beach, a highway, a park, a camp site, an arena, a stadium, a name of an attraction, a name of a landmark, a name of a building, a name of an education facility, a street address, and the like. Furthermore, a number of geographical locations of interest that may be requested for one travel route may be ten or less.

In yet another implementation, the UI 114 may receive a request from the user 108 for a trajectory that is based on a specific travel sequence for the multiple geographical locations of interest. For instance, the user 108 may specify that she would like to visit "23 Peach St," first, before visiting "The Capitol" second, and then "9 Main St." In this instance, each one of the locations may have a number identifying a particular order of travel for the locations. That is, a first location may be indicated as "location 1 (L1)", a second as "location 2 (L2)", and so forth to show a desired travel sequence. In some instances, the order is specified explicitly by the user or by another user (e.g., a travel agent). In other instances, meanwhile, the order is determined based on other factors, such as a bus route, a travel agency's itinerary, traffic flow patterns of one way streets, traffic patterns, and the like.

In the illustration, the user 108 accesses the trajectory route service 106 via the network 104 using their computing device 102. The trajectory route service 106 presents the UI 114 to receive user input for geographical locations of interest and/or to provide the trajectory or the travel route for the multiple geographical locations of interest. In an implementation, the user 108 accesses a trajectory map for a particular region. Upon activating the particular region on the map, the user 108 may select the geographical locations of interest in the particular region, and the trajectory route service 106 provides a marked track for the trajectory route. In other implementations, the trajectory route may be used to plan daily routes, to plan for vacations, to analyze traffic flow patterns, to survey popular routes through attractions, to locate trajectories that are nearest to desired stationary places, and the like.

Figure 2:
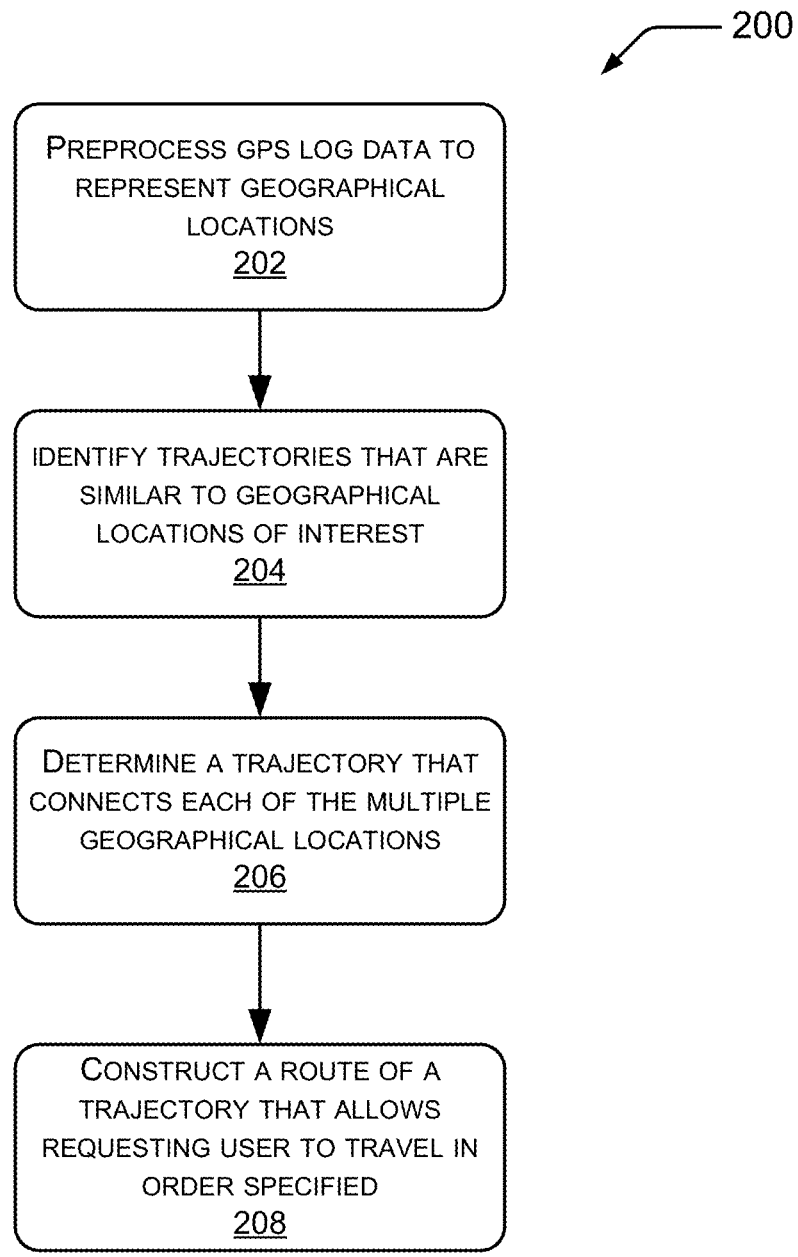
FIG. 2 is a flowchart showing illustrative phases for providing the trajectory route. The phases include preprocessing data, identifying trajectories that are similar, determining a trajectory connecting each of the geographical locations of interest, and constructing the trajectory route for use by the architecture of FIG. 1.

FIG. 2 is a flowchart showing an illustrative overview process 200 of high level functions performed by the trajectory route service 106. The process 200 may be divided into four phases, an initial phase to preprocess GPS logs 202 (or other location-based logs), a second phase to identify trajectories from GPS logs that are similar to the geographical locations of interest 204, a third phase to determine a best trajectory 206, and a fourth phase to construct a route to connect the multiple geographical locations of interest 208. All of the phases may be used in the environment of FIG. 1, may be performed separately or in combination, and without any particular order.

The first phase is to preprocess raw GPS logs to represent geographical locations 202. The trajectory route service 106 receives the GPS logs associated with respective individual devices. Each of the GPS logs includes trajectories connecting a set of geographical locations previously visited by an individual of a respective individual device.

The second phase is to identify trajectories from the GPS logs that are similar to the geographical locations of interest 204. The trajectory route service 106 calculates a proximal similarity between the set of geographical locations of interest and respective sets of geographical locations from the GPS logs.

The third phase is to determine the best trajectory connecting to each of the multiple geographical locations of interest 206. The trajectory route service 106 provides the best trajectory that connects the geographical locations of interest.

The fourth phase is to construct a route of a trajectory that allows requesting user to travel in order specified 208. The trajectory route service 106 provides the route in a travel sequence or allows a requesting user to travel to the multiple geographical locations of interest in an order specified by the user. Details of the phases are discussed in FIGS. 3-11 below.

Exemplary Processes

FIGS. 3, 4, 6, 7, and 8 are flowcharts showing illustrative processes for the phases mentioned above. The processes are illustrated as a collection of blocks in logical flowcharts, which represent a sequence of operations that can be implemented in hardware, software, or a combination. For discussion purposes, the processes are described with reference to the computing environment 100 shown in FIG. 1. However, the processes may be performed using different environments and devices. Moreover, the environments and devices described herein may be used to perform different processes.

For ease of understanding, the methods are delineated as separate steps represented as independent blocks in the figures. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible for one or more of the provided steps to be omitted.

Preprocess GPS Log Data

Figure 3:
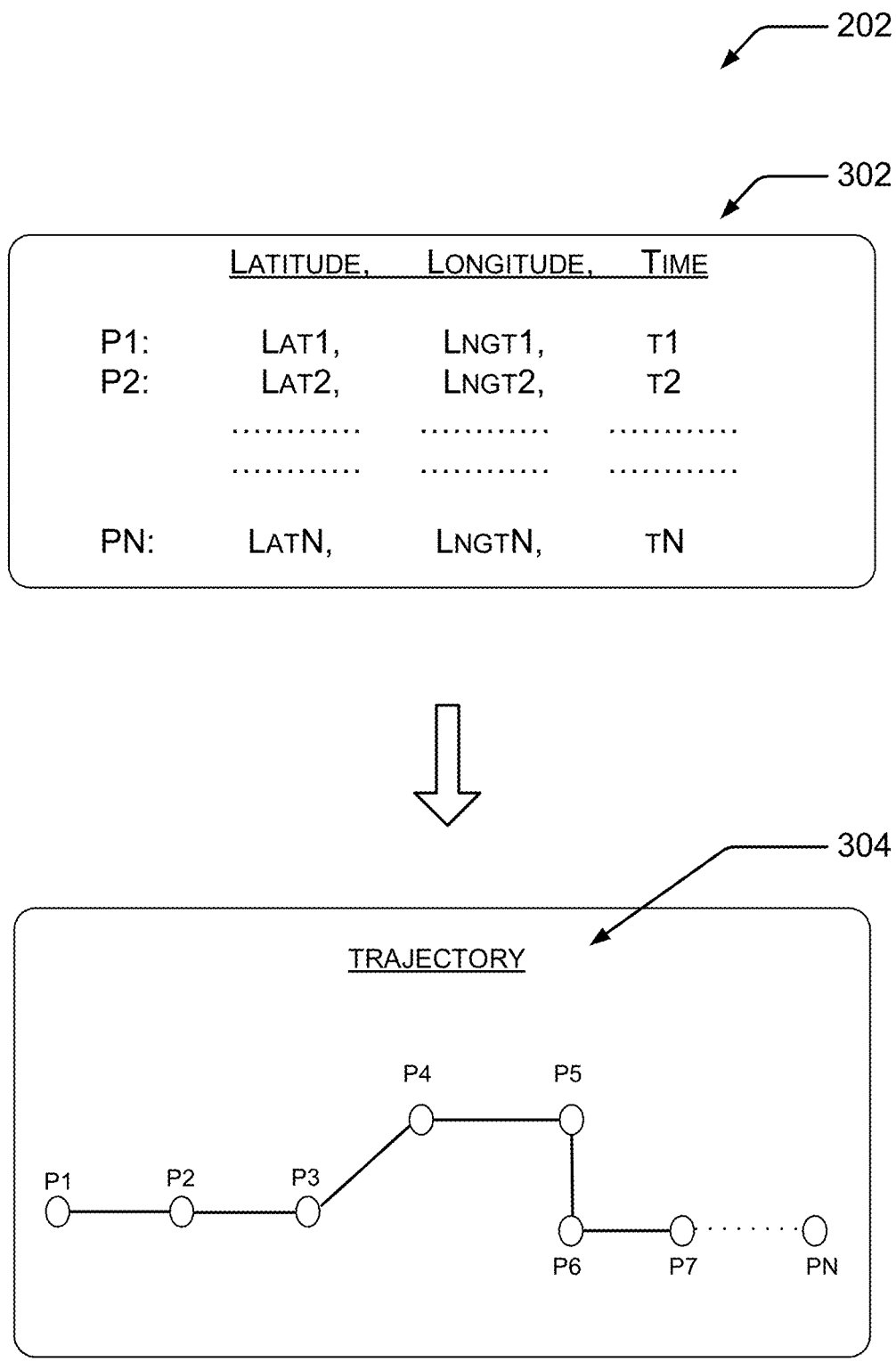
FIG. 3 illustrates an illustrative process of preprocessing GPS log data.

FIG. 3 illustrates illustrative process for performing the phase 202 of preprocessing GPS log data. At 302, the trajectory route service 106 obtains, collects, or receives raw GPS log data (or other location based log) of geographical locations of individual users. The logs 302 may be obtained from GPS devices, tracking units, mobile phones, or any other device, as long as these devices are located in close proximity to each of the individuals. The GPS devices may be set to automatically track the position of the GPS device at regular intervals. Each of the individual users is asked prior to tracking or to sharing their movements and locations if their GPS data may be included as a part of a GPS data collection. The options are that the individual user may choose to opt-in to participate or to opt-out to not participate in the tracking or sharing of their GPS data. As such, the techniques track the GPS data after receiving user consent.

In another implementation, the trajectory route service 106 may obtain GPS logs from GPS-log driven applications, social networks, or services on the web. Each individual user may be equipped with a GPS device for tracking data. The device may include a GPS navigation device, a GPS phone, or any other type of GPS sensor that collects GPS log data at a high sampling rate, such as every two to eight seconds per point. The GPS data may be uploaded to the web by the users to show their positions and to share their GPS locations by agreeing to opt-in to participate in the data collection.

The GPS log 302 is generally a collection of a series of points represented points containing a latitude (Lat), a longitude (Lngt) and a time (T).

The trajectory route service 106 sequentially connects the points into a GPS trajectory 304. The trajectory 304 may be represented by:

$$R=(p_1, p_2, \ldots, p_n)$$

Where n is a number of points in the trajectory, n=8.

Identify Points on Trajectory to Represent Geographical Locations

Figure 4:
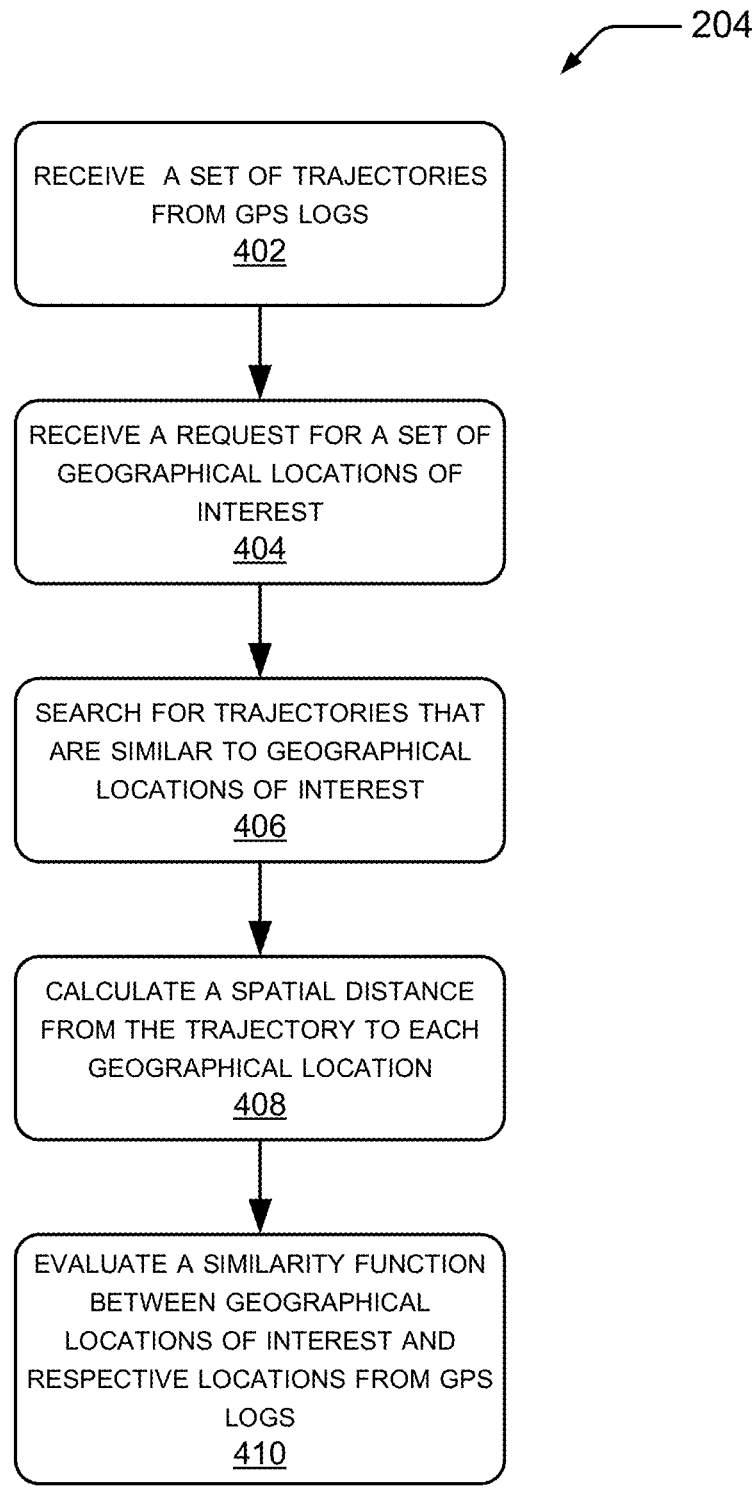
FIG. 4 is a flowchart showing an illustrative process of identifying trajectories from the GPS logs that are similar to the geographical locations of interest.

FIG. 4 illustrates an illustrative process of the phase 204 of identifying points on a trajectory from the GPS logs to represent the geographical locations of interest. The trajectory route service 106 receives a set of trajectories from GPS logs 402, as described in FIG. 3.

Next, the trajectory route service 106 receives a request for a set of geographical locations of interest 404 specified by the user 108 through user input on the map or by text. The set of geographical locations of interest specified by the user 108 may be represented as:

$$Q=\{q_1, q_2, \ldots, q_m\}$$

where m is a number of locations. The geographical locations of interest Q may be assigned with a travel sequence, if specified by the user 108. If there is a travel sequence, Q is treated as a sequence of locations from $q_1$ to $q_m$.

The trajectory route service 106 searches for trajectories from the GPS database that are similar to the geographical locations of interest 406. In order to identify how well a trajectory from the GPS logs connects the geographical locations of interest, a distance (e.g., spatial) is measured with a value or distance amount and a similarity function or a proximal similarity are calculated. For example, at least one trajectory from the GPS logs is determined based on the at least one trajectory connecting a set of geographical locations from the GPS logs having a highest calculated proximal similarity to the set of geographical locations of interest specified by the user The trajectory route service 106 calculates a spatial distance from the trajectory from the GPS logs to each geographical location of interest 408. The trajectory route service 106 calculates the spatial distance by using the following equation:

$$Dist_q(q_i, R) = \min_{p_j \in R}\{Dist_e(q_i, p_j)\}$$

where R represents the trajectory, $R=\{p_1, p_2, \ldots, p_l\}$. On the right side of the equation, $Dist_e(q_i, p_j)$ represents an Euclidean distance between a location of interest, $q_i$, and a trajectory point, $p_j$. The Euclidean distance, $Dist_e(q_i, p_j)$ is a measured amount of distance from $q_i$ to any point $p_j$ on R. If a small, short, or a closest distance has been identified, the $<q_i,p_j>$ is referred to as a matched pair where $p_j$ is a nearest point on R to $q_i$. However, $p_j$ may be matched with multiple geographical locations.

The trajectory route service 106 evaluates the similarity function or the proximal similarity between the set of geographical locations of interest and the respective sets of geographical locations from the GPS logs, based on the trajectory from the GPS logs 410. The similarity is evaluated by using the following equation:

$$Sim(Q,R) = \Sigma_{i=1}^m e^{-Dist_q(q_i,R)}.$$

The exponential function $e^{-Dist_q(q_i,R)}$ is used to measure a contribution of each matched pair to Sim(Q,R). The contribution from each matched pair may be determined by assigning weights to each pair. A larger weight may be assigned to a matched pair that is closer in distance while a smaller weight or less weight may be assigned to a matched pair that is further apart. The assigned weight results in an exponential decreasing of contribution as $Dist_q(q_i,R)$ increases. Based on the weight assigned, the trajectory from the GPS logs that is within a threshold distance to each of the geographical locations of interest is considered to be "similar."

In an implementation, the trajectory route service 106 may determine whether a distance between the geographical location of interest and the point in the trajectory from the GPS logs is greater than or less than a predetermined threshold. In an event that the distance is greater than the predetermined threshold, the trajectory route service 106 will refrain from including the trajectory in a candidate set of GPS trajectories. In an event that the distance is less than the predetermined threshold, the trajectory route service 106 may include the trajectory in the candidate set of GPS trajectories.

Figure 5:
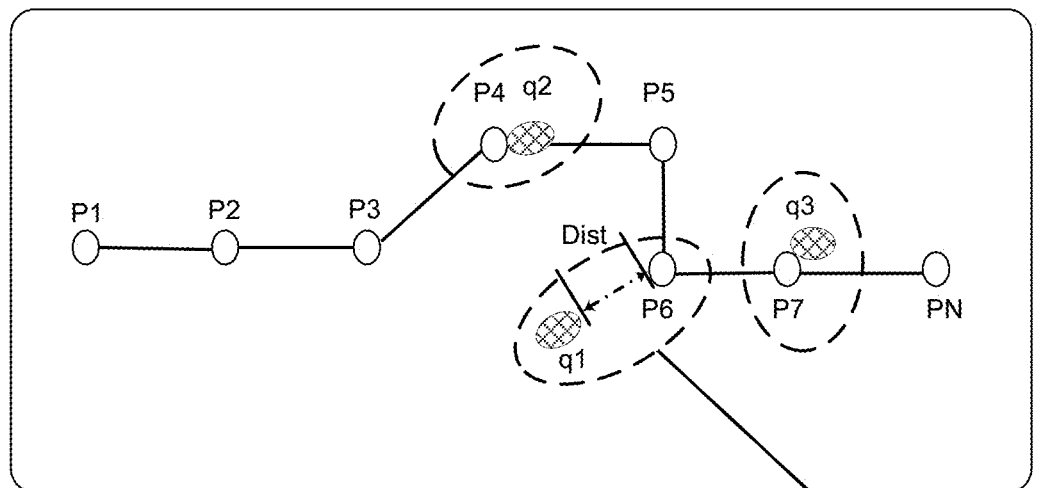
FIG. 5 illustrates examples of diagrams of matching points of a trajectory from the GPS logs to each of one or more geographical locations.
Figure 5:
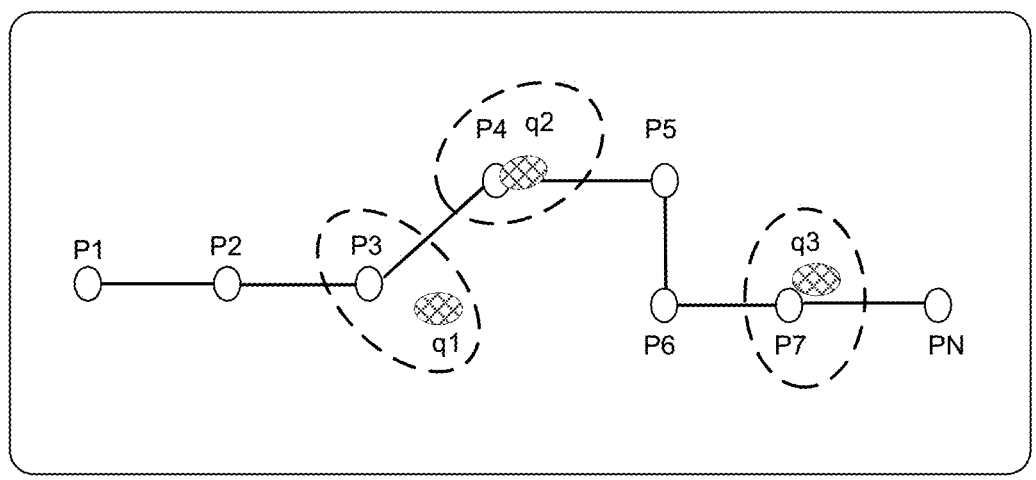

FIG. 5 illustrates an illustrative process 500 of identifying trajectories by calculating the closest distance of the trajectory points to the geographical locations of interest. The points on trajectory R are shown as $R=(p_1, p_2, p_3, p_4, p_5, p_6, p_7, p_n)$. For example, the geographical locations of interest are identified as q1, q2, and q3, represented by oval shapes in a hatchet pattern in 500. The geographical locations of interest identified as q1, q2, and q3 are matched to the closest trajectory points, $p_6$, $p_4$, and $p_7$, respectively as shown at 500. The dashed ellipses illustrate the matched pairs (e.g., matched pairs are points of the trajectory from the GPS logs closest to the geographical locations of interest). For example, the distance values for the matched pairs are: $Dist_e(q_1, p_6)=1.5$, $Dist_e(q_2, p_4)=0.1$, and $Dist_e(q_3, p_7)=0.1$. Thus, the similarity function may be represented as: $Sim(Q,R)=e^{-Dist_e(q_1,p_6)}+e^{-Dist_e(q_2,p_4)}+e^{-Dist_e(q_3,p_7)}=e^{-1.5}+e^{-0.1}+e^{-0.1}$.

The distance measurement for $Dist_e(q_1, p_6)=1.5$ is shown at 502.

Proceeding to 504 is an illustrative travel sequence specified by the user 108 for the geographical locations of interest. The matched points on the trajectory from the GPS logs may help satisfy the order that is specified by the user. However, the trajectory route service 106 may adjust the matched points, based on a travel sequence to the geographical locations in the order specified by the user 108. For example, the matching no longer occurs since a matched point $p_j$ for the geographical location of interest $q_i$ may not be the nearest point to $q_i$ any longer. For example, the user 108 may specify the travel sequence of the locations, represented as $q_1 \rightarrow q_2 \rightarrow q_3$. However, the actual visiting order of the matched points on R is from $p_4 \rightarrow p_6 \rightarrow p_7$, assuming that the trajectory, R travels from left to right. The travel sequence is no longer from $p_6 \rightarrow p_4 \rightarrow p_7$. These matched pairs no longer conform to the user specified order, causing the trajectory route service 106 to adjust the matching of trajectory points to satisfy the order of travel requested by the user 108.

Shown at 504, $q_1$ is re-matched with p3 and the new travel sequence is from $p_3 \rightarrow p_4 \rightarrow p_7$, which satisfies the user-specified order. The goal is to maximize a sum of the contribution of each matched pair, based on the weights, while still keeping the order of visits. The sum of the contribution of the pairs, $<q_1,p_3>$, $<q_2,p_4>$, and $<q_3,p_7>$ is maximized among all of the possible combinations that satisfy the order of travel.

For the order specified by the user 108, an equation to calculate the similarity function with order $Sim_o(Q,R)$ for the geographical locations of interest is:

$$Sim_o(Q, R) = \max \begin{cases} e^{-Dist_e(Head(Q),Head(R))} + \\ Sim_o(Rest(Q), R) \\ Sim_o(Q, Rest(R)) \end{cases}$$

where Head(*) is a first point of *, where $Head(Q)=q_1$ and Rest(*) indicates that a rest part of * after removing the first point, e.g., $Rest(Q)=\{q_2, q_3, \ldots, q_m\}$. The equation for $Sim_o(Q,R)$ defines maximal solutions for subproblems: $Sim_o(Rest(Q),R)$ and $Sim_o(Q,Rest(R))$. Therefore, once Head(Q) and Head(R) match, $e^{-Dist_e(Head(Q),Head(R))}$ may be summed up to the similarity function and shift to the matching of the rest of Q by using $Sim_o(Rest(Q),R)$. Head(R) is retained for a next round of comparison as a trajectory point may be matched with more than one geographical locations of interest.

Dynamic programming is used to solve the similarity and to keep the matched trajectory points in a same order as the geographical locations of interest. The equation to evaluate the similarity function is:

$$Similarity(Q,R_i)_{R_i \in T} \geq Similarity(Q,R_j)_{R_j \in T-T'}$$

where Similarity$(Q,R_i)$=Sim$(Q,R_i)$ if no order is specified. If there is an order-specified, a subscript of o is used, Similarity $(Q,R_i)$=Sim$_o(Q,R_i)$.

The trajectory route service 106 may search for trajectories from the GPS logs by retrieving trajectory points from the GPS logs that are within a threshold distance to each of the multiple geographical locations of interest, a trajectory point represents a geographical location previously visited by the user of a respective user device. The trajectory route service 106 identifies the retrieved trajectory points that are within an intersection of the multiple geographical locations of interest. Furthermore, the trajectory route service 106 may determine that the trajectory points that are within the intersection as being closest in distance to the multiple geographical locations of interest.

Identifying "Best" Trajectory

Figure 6:
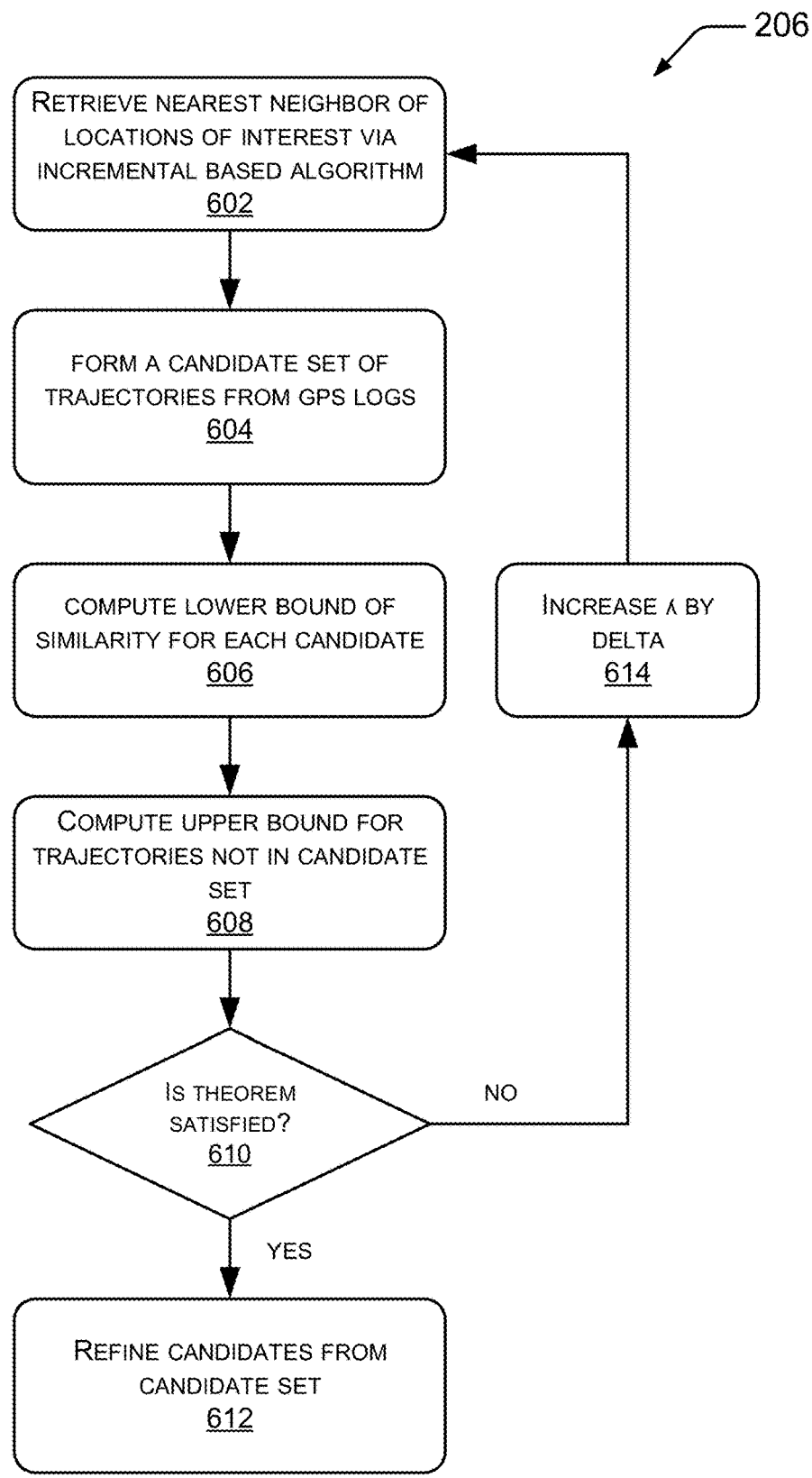
FIG. 6 is a flowchart showing an illustrative process of calculating a proximal similarity between (1) the set of geographical locations of interest specified by the user, and (2) respective sets of geographical locations from the GPS logs.

FIG. 6 illustrates an illustrative process 206 of determining the best trajectory to connect the geographical locations of interest. The trajectory route service 106 may use a spatial index that utilizes a rectangle-tree (R-tree) to search for trajectories from the GPS logs, followed by an in-depth study on further adaption and optimization. The R-tree includes tree data structures for indexing multi-dimensional information, such as the coordinates of the geographical locations. The R-tree splits space with hierarchically nested polygons, such as rectangles. Here, points of all the database trajectories are simply indexed by one single R-tree, while points from the same trajectory are further connected by a double linked list.

The trajectory route service 106 retrieves a nearest neighbor ($\lambda$-NN) of each geographical location of interest by using an incremental based k-nearest neighbor (k-NN) algorithm 602. This is assuming there is a set of geographical locations of interest of $Q=\{q_1, q_2, \ldots, q_m\}$, without specifying the order of travel for the multiple geographical locations of interest. The trajectory route service 106 retrieves the $\lambda$-NN of each geographical location of interest ($\lambda>0$) using the following:

$$\lambda - NN(q_1) = \{p_1^1, p_1^2, \ldots, p_1^{\lambda}\}$$
$$\lambda - NN(q_2) = \{p_2^1, p_2^2, \ldots, p_2^{\lambda}\}$$
$$\ldots$$
$$\lambda - NN(q_m) = \{p_m^1, p_m^2, \ldots, p_m^{\lambda}\}.$$

The trajectory route service 106 forms or creates a candidate set of trajectories from the GPS logs 604. A set of trajectories that have been scanned from the GPS logs contain at least one point in $\lambda$-NN$(q_i)$ that is part of the candidate set $C_i$ for identifying the "best" trajectory (k-BT) that connects each of the multiple geographical locations of interest. There may be several $\lambda$-NN points that belong to the same trajectory, thus a cardinality $|C_i| \leq \lambda$ may exist. The trajectory route service 106 merges the candidate sets that have been generated by all of the nearest neighbor searches $\lambda$-NN$(q_i)$. As a result of the merging, there may be a possibility of very different trajectories as candidates for the best trajectory, based on the following:

$$C=C_1 \cup C_2 \cup \ldots \cup C_m = \{R_1, R_2, \ldots R_f\}$$

where f is a number of trajectories. For each candidate trajectory $R_x (\in[1,f])$ that is within the candidate set C, the trajectory must contain at least one point whose distance to the corresponding geographical location of interest is determined. For example, if $R_x \in C_i (C_i \subseteq C)$, then the $\lambda$-NN of $q_i$ must include at least one point on $R_x$, and the shortest distance from $R_x$ to $q_i$ is known. As a result, at least one matched pair of points between $R_x$ and some $q_i$ is identified. Thus, there may be a subset of trajectories from the candidate set that are matched to the at least the geographical location of interest specified by the user.

The trajectory route service 106 computes a lower bound LB of similarity function or proximal similarity for each candidate 606. The LB may be computed for each candidate $R_x (\in[1,f])$ by using the found matched pairs:

$$LB(R_x) = \sum_{i\in[1,m]\land R_x \in C_i} \left( \max_{j\in[1,\lambda]\land p_i^j \in R_x} \left\{ e^{-Dist_e(q_i, p_i^j)} \right\} \right).$$

Here, $\{q_i | i\in[1,m]^\wedge R_x \in C_i\}$ denotes a subset of geographical locations of interest that has already been matched with some point on $R_x$, and the $p_i^j$ which achieves the maximum $e^{-Dist_e(q_i,p_i^j)}$ with respect to $q_i$ is the point on $R_x$ that is closest to $q_i$. Thus, $$\max_{j\in[1,\lambda]\land p_i^j \in R_x} \left\{ e^{-Dist_e(q_i,p_i^j)} \right\} = e^{-Dist_e(q_i,R_x)}.$$

The equation $LB(R_x)=\Sigma_{i\in[1,m]\land R_x\in C_i}(e^{-Dist_e(q_i,R_x)})$ not greater than $\Sigma_{i=1}^m e^{-Dist_q(q_i,R_x)}$, since it only takes the matched pairs that have been identified, into account. Thus, LB($R_x$) may lowerbound the exact similarity Sim(Q,$R_x$) that is defined in Sim(Q,R)=$\Sigma_{i=1}^m e^{-Dist_q(q_i,R)}$. However, if $R_x \notin C_i$, then none of the trajectory points have been scanned by $\lambda$-NN($q_i$).

The trajectories that are not contained in the candidate set C, are indicative that the trajectories have not been scanned by any of the nearest neighbor $\lambda$-NN searches, and any point on them may have a distance to qi no less than the distance of the $\lambda^{th}$NN of $q_i$ (i.e., Dist$_e(q_i,p_i^\lambda)$). Therefore, the trajectory route service 106 computes an upper bound UB for of similarity function or proximal similarity for all of the non-scanned trajectories 608 (or trajectories that are not identified to be included in the candidate set). The equation to compute the upper bound UB is: US$_n=\Sigma_{i=1}^m e^{-Dist_e(q_i,p_i^\lambda)}$. Based on the results of the lower bound LB and the upper bound UB, the trajectory route service 106 applies a pruning mechanism to remove the unqualified candidates from the candidate set. The trajectory route service 106 identifies the trajectories that may be used as the best trajectory. The pruning mechanism is to avoid scanning the whole trajectory database which utilizes more time and cost. The search space for the trajectories is restricted by using the above method.

The trajectory route service 106 uses a theorem to determine if the number of best connected trajectory (k-BT) is included as part of the candidate set. The theorem is based on without specifying the order of travel to the geographical locations of interest. The trajectory route service 106 may receive a subset of a number of trajectories C' from the candidate set C after searching the $\lambda$-NN of each geographical location of interest. The result found may be $$\min_{R_x \in C'} \{LB(R_x)\} \geq UB_n,$$

then the number of best connected trajectories may be included in the candidate set C. The proof is for any $R_x \in C'$, Sim(Q,$R_x$)$\geq$LB($R_x$) and for any $R_y \notin C$ (i.e. $R_y \in \overline{C}$), UB$_n \geq$Sim(Q,$R_y$). When the trajectory route service 106 may determine that:

$$\forall R_x \forall R_y (R_x \in C'' R_y \notin C) \rightarrow (Sim(Q,R_x) \geq Sim(Q,R_y)).$$

Based on this, the connected trajectories result may not be from $\underline{C}$ but are from the candidate set C.

The trajectory route service 106 updates k maximal lower bounds, k-LB[ ] ⊂ LB[ ]. The trajectory route service 106 determines if the theorem is satisfied at 610. If the theorem is satisfied, then the k-BT that is included in the candidate set and the non-scanned trajectories beyond the candidate set may be safely filtered. Then the trajectory route service 106 proceeds to 612.

The trajectory route service 106 refines the candidates from the candidate set 612. Detailed discussion of the refining follows in FIG. 7.

Returning to 610, if the theorem is not satisfied, the process moves to the right side 614. If the best connected trajectory k-BT is not found in the candidate set, the trajectory route service 106 increases λ by a Δ 614 for the trajectory searches to locate or to ensure that the best connected trajectory is contained in the candidate set. If λ is set to be a very large value, the possibility is that the connected trajectories results will all be retrieved, but the search space may be huge, which may take a longer time period. However, a smaller λ may not be sufficient to ensure that the connected trajectories results are included in the candidate set, leading to a false dismissal. Rather, than choosing a fixed λ, the trajectory route service 106 applies an incremental number of nearest neighbor algorithm by increasing λ by a Δ for a next round of iterations. The process returns to 602 and starts another iteration. This k-NN algorithm provides an efficient retrieval of the candidate trajectories with a filtering and refinement mechanism.

The k-NN algorithm for computing, refining, and pruning steps of FIG. 6 is shown below:

| k-NN Algorithm Identify Connected Trajectories |
|---|
| Input: k,Q |
| Output: k-BT |
| 1.　　Candidate Set C; |
| 2.　　Upperbound $UB_n$; |
| 3.　　Lowerbounds [LB[ ], k − LB[ ]] |
| 4.　　Integer λ ← k; |
| 5.　　While true do |
| 6.　　\|　　For each $q_i \in Q$ from $q_1$ to $q_m$ do |
| 7.　　\|　　\|　　λ −NN($q_i$) ← KNN($q_i$,λ); |
| 8.　　\|　　\|　　$C_i$ ← trajectories scanned by λ −NN($q_i$); |
| 9.　　\|　　$C \leftarrow C_1 \cup C_2 \cdots \cup C_m$ |
| 10.　\|　　if \|C\| ≥ k then |
| 11.　\|　　\|　　compute LB [ ] for all trajectories in C; |
| 12.　\|　　\|　　k-LB[ ]←LB[ ].topK( ); |
| 13.　\|　　\|　　if k-LB[ ].min≥$UB_n$ then |
| 14.　\|　　\|　　\|　　k-BT← refine (C); |
| 15.　\|　　\|　　\|　　return k-BT; |
| 16.　\|　　λ←λ + Δ; |

Figure 7:
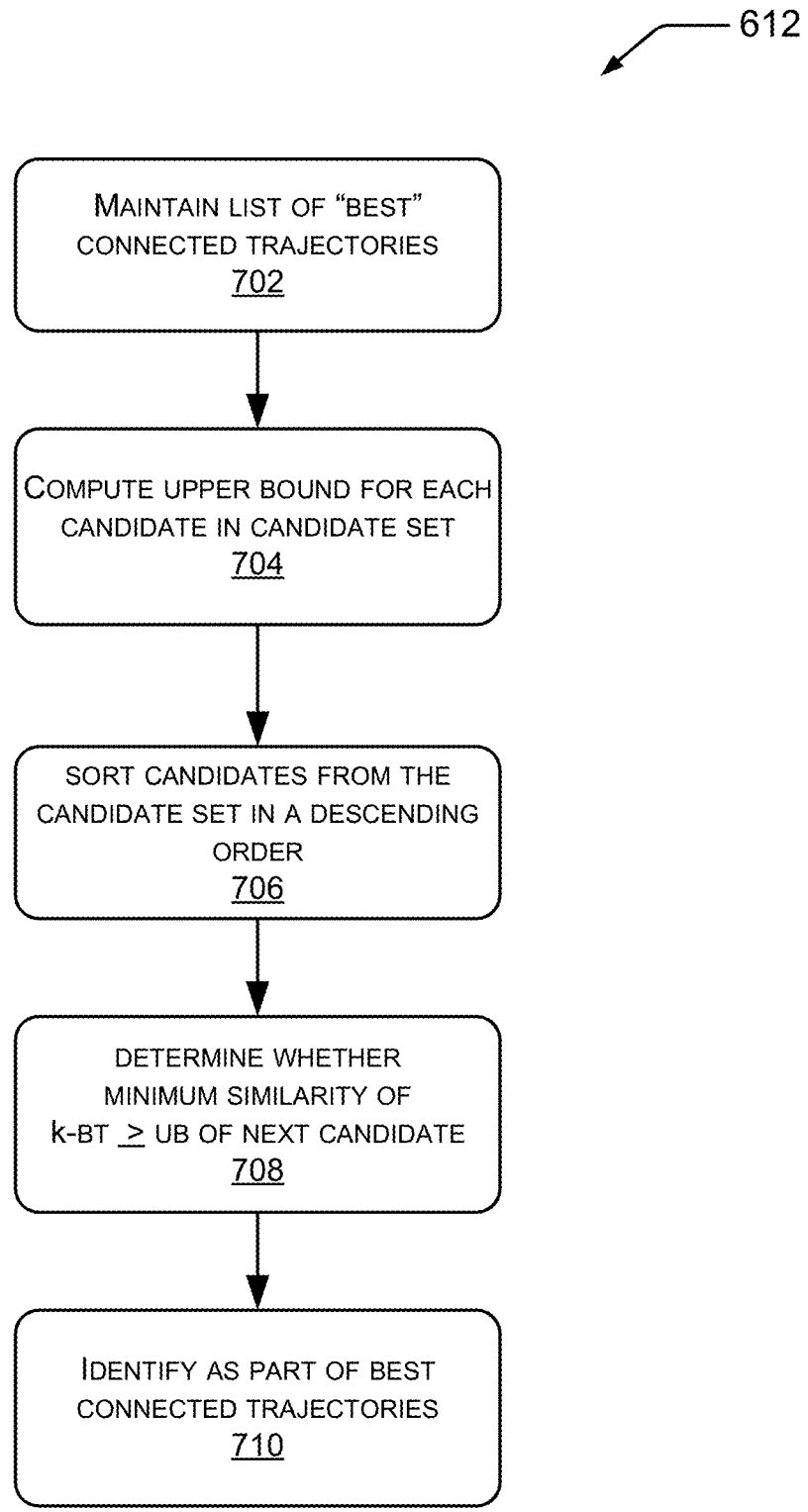
FIG. 7 is a flowchart showing an illustrative process of refining and pruning unqualified trajectories in constructing a requested trajectory or a travel route.

FIG. 7 illustrates an illustrative process 612 of refining candidates from the candidate set. The trajectory route service 106 maintains a list of the best connected trajectories identified and the similarity values 702 from the process described in FIG. 6.

The trajectory route service 106 computes the UB for each candidate in the candidate set 704. The equation to compute the UB for each candidate is:

$$\min_{R_x \in C'} \{LB(R_x)\} \geq UB_n,$$

$$UB(R_x) = \sum_{i \in [1,m] \wedge R_x \in C_i]} \max_{j \in [1,\lambda] \wedge p_i^j \in R_x} \left\{ e^{-Dist_e(q_i, p_i^j)} \right\} + \sum_{i \in [1,m] \wedge R_x \notin C_i} (e^{-Dist_e(q_i, p_i^\lambda)})$$

where $R_x \in C = \{C_1 \cup C_2, \ldots, \cup C_m\}$. For a geographical location of interest within $q_i | i \in [1,m]^\wedge R_x \in C_i$, the closest point on $R_x$ to is found by the λ−NN($q_i$) search, and accumulate to UB($R_x$), the contribution of the matched pair, <$q_i$,closestPoint>. Otherwise, for a $q_i$ that the nearest neighbor search has not covered any point on $R_x$ (i.e. $R_x \notin C_i$), the trajectory route service 106 considers that the current $\lambda^{th}$NN of $q_i$ (i.e. $p_i^\lambda$) may be closer than the matched point, and accumulate the contribution of the $\langle q_i, p_i^\lambda \rangle$ pair to UB($R_x$). Thus, the similarity or proximal similarity may be defined as:

$$Sim(Q, R_x) - UB(R_x) = \sum_{i=1}^{m} e^{-Dist_q(q_i, R_x)} -$$

$$\sum_{i \in [1,m] \wedge R_x \in C_i} (e^{-Dist_q(q_i, R_x)}) -$$

$$\sum_{i \in [1,m] \wedge R_x \notin C_i} (e^{-Dist_e(q_i, p_i^\lambda)})$$

$$= \sum_{i \in [1,m] \wedge R_x \notin C_i} (e^{-Dist_q(q_i, R_x)} - e^{-Dist_e(q_i, p_i^\lambda)}) \leq 0.$$

For any candidate $R_x$ within C, the similarity function or the proximal similarity may be shown as $Sim(Q,R_x) \leq UB(R_x)$. The algorithm for refining the candidate set is shown below.

The trajectory route service 106 sorts the candidates from the candidate set in a descending order of UB 706.

The trajectory route service 106 determines whether the minimum similarity of the best connected trajectories is greater than or equal to the UB of the next trajectory candidate, $R_{x+1}$ 708. If this occurs, the trajectory route service 106 identifies the trajectories as part of being included in the best connected trajectories 710. The trajectory route service 106 returns the connected trajectories as a final result.

The algorithm to compute refining candidates from the candidate set 612 is shown below:

| Algorithm Refine Candidate Set C |
|---|
| 1.　　k-BT← SortedList(k); |
| 2.　　compute UB for each candidate in C; |
| 3.　　sort candidates in C by UB in descending order; |
| 4.　　for x=1 to \|C\| do |
| 5.　　\|　　compute Sim (Q, $R_x$) by traversing $R_x$ ; |
| 6.　　\|　　if x ≤ k then k-BT.insert ($R_x$, Sim(Q, $R_x$)); |
| 7.　　\|　　else |
| 8.　　\|　　\|　　if x = \|C\| or k − BT.min ≥ UB($R_{x+1}$) then |
| 9.　　\|　　\|　　\|　　return k-BT; |
| 10.　\|　　\|　　if Sim(Q, $R_x$) > k − BT.min then |
| 11.　\|　　\|　　\|　　k-BT.removedLast( ); |
| 12.　\|　　\|　　\|　　K-BT.insert ($R_x$, Sim(Q, $R_x$)). |

Construct Trajectory Route and Examples of Trajectory Routes

Figure 8:
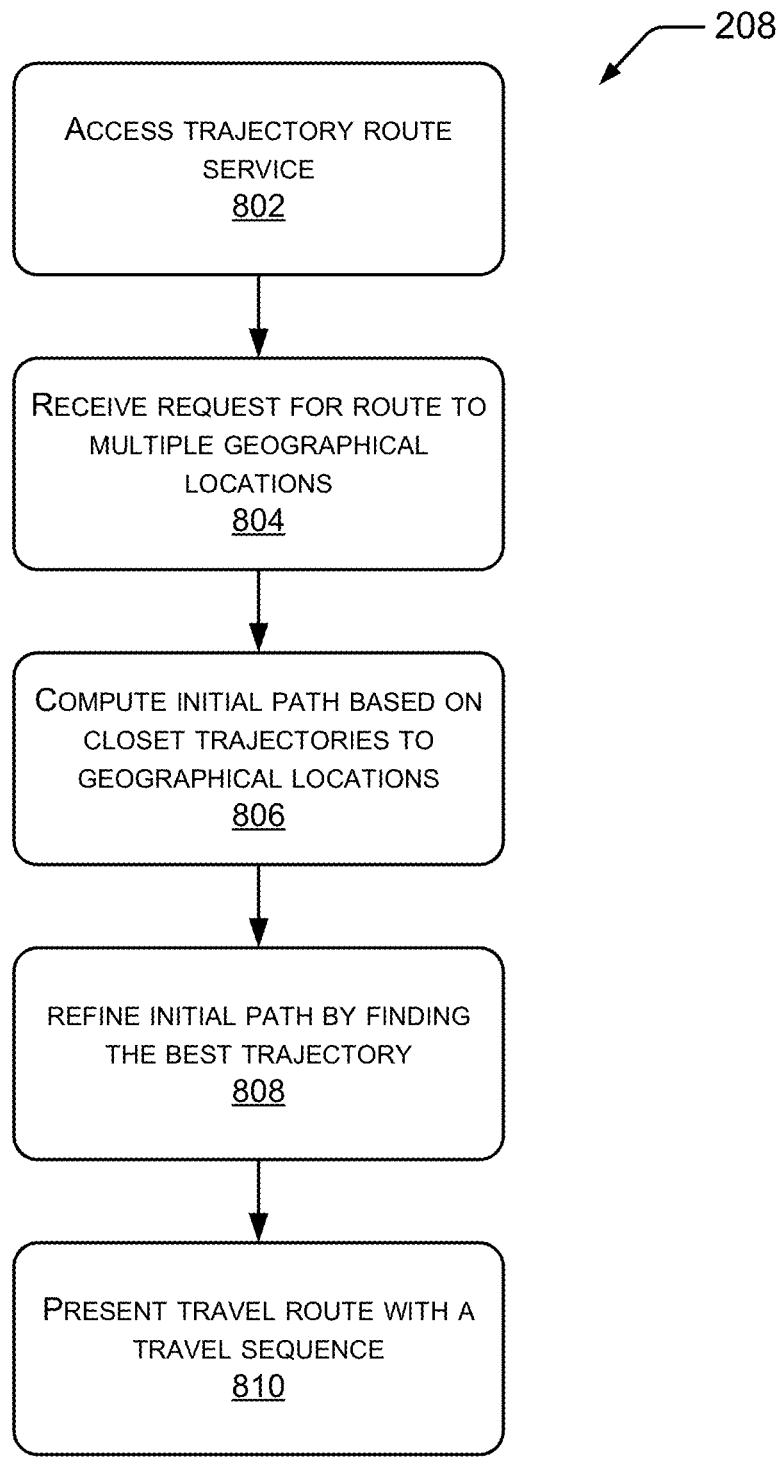
FIG. 8 illustrates an illustrative process of constructing a travel route in response to receiving user input.
Figure 9:
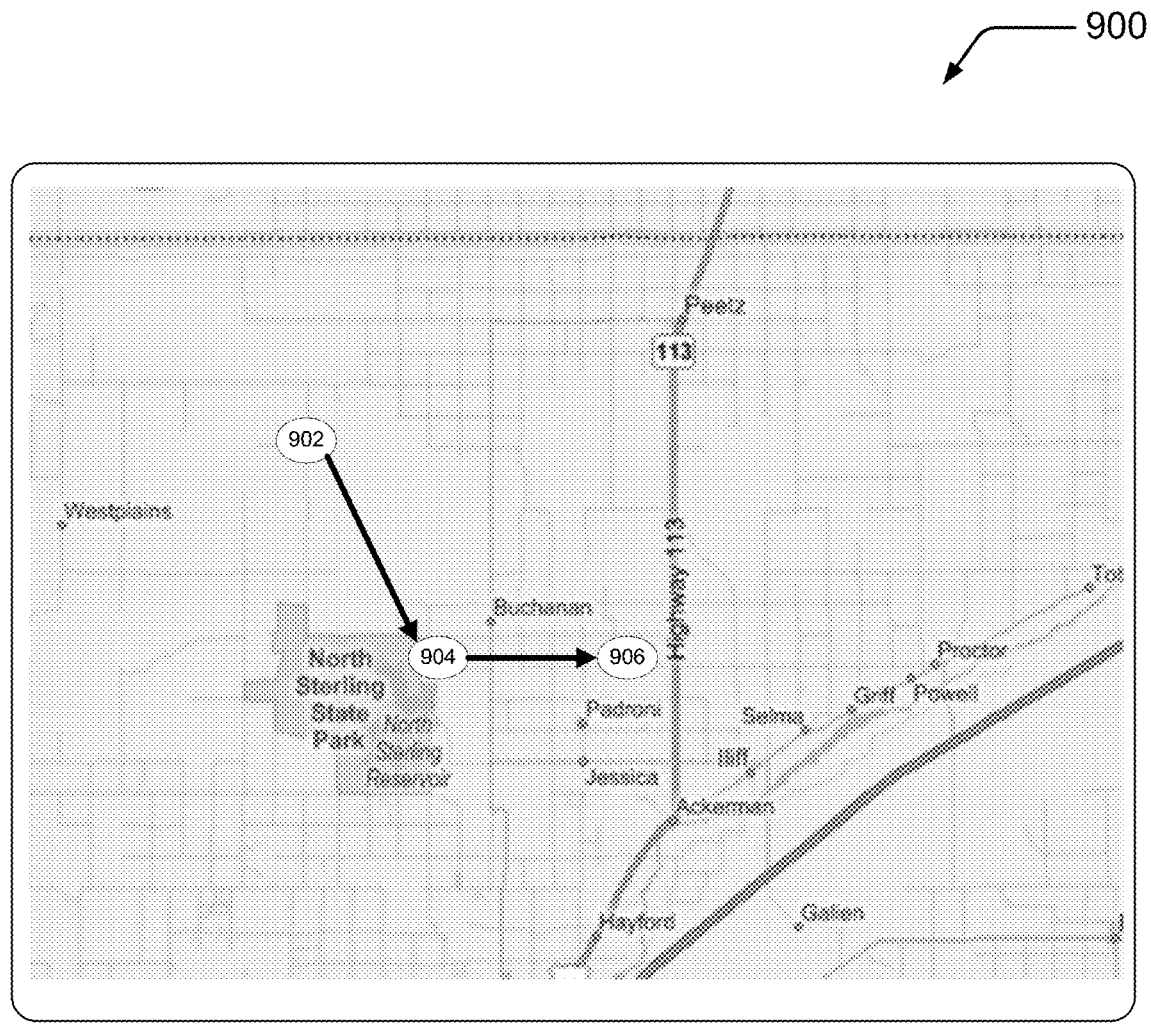
FIGS. 9-10 illustrate example trajectory routes.
Figure 10:
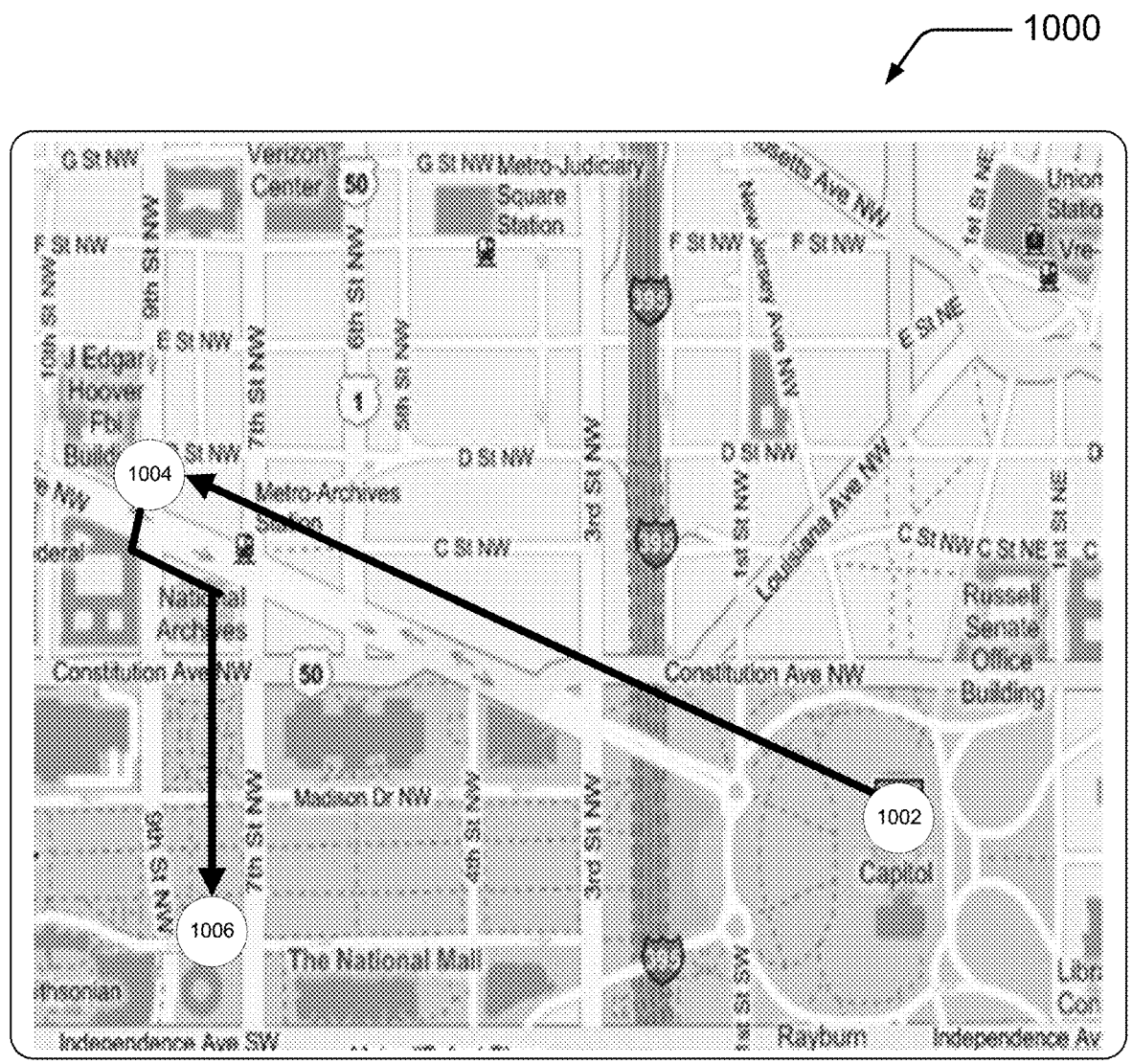
Figure 10:
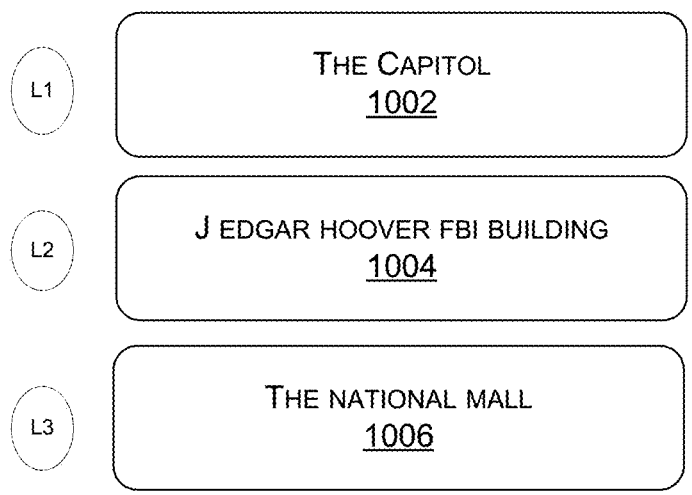

FIGS. 8-10 illustrate an illustrative process 208 of constructing the trajectory route and illustrative trajectory routes. In FIG. 8, the process 208 constructs the trajectory or the travel route that allow the user 108 to travel in the order specified, if requested.

The trajectory route service 106 accesses the trajectory route service 802. A trajectory route map is constructed from global position system (GPS) logs associated with respective individual devices, each of the GPS logs include trajectories that connect a set of geographical locations previously visited by an individual of a respective individual device.

The trajectory route service 106 receives a request from the user 108 for a route to multiple geographical locations of interest 804. The user 108 may enter the request by selecting the multiple geographical locations of interest on the trajectory route map. In another implementation, the user may specify the multiple geographical locations of interest by entering input on the UI 114. As mentioned, the request may be described as a set of geographical locations of interest.

The trajectory route service 106 computes an initial path by identifying trajectories that are closest to each of the multiple geographical locations of interest 806. The trajectory route service 106 refines the initial path by finding the best trajectory 808 from the GPS logs that sequentially connects each of the multiple geographical locations of interest. The refining process was described in FIG. 7. The trajectory route service 106 presents the trajectory route with a travel sequence 810 based at least in part on connecting the multiple geographical locations of interest.

As discussed previously, the user 108 may specify a traveling order. When the order is specified, the trajectory route service 106 marks the travel route to allow the requesting user to view the route and to travel in the order specified 208.

FIG. 9 illustrates an illustrative trajectory route 900 of multiple geographical locations of interest without specifying any particular travel order by the user 108. For example, the user 108 inputs locations of for a "camp site" 902 that is located in Colorado near the vicinity of a town known as Buchanan, "North Sterling State Park" 904 to identify a park area for activities, such as hiking or boating, and "nearest highway" 906 to find a shortest distance route to travel from North Sterling State Park to a road. This travel route may be given by searching the trajectories from the GPS logs being closest in distance to each of the multiple geographical locations of interest 902, 904, and 906.

In an implementation, the trajectory route service 106 accesses a trajectory route model constructed from global positioning system (GPS) trajectories and geographical regions and receives user input to identify multiple geographical locations by the user clicking on a trajectory route map. The trajectory route service 106 computes the initial trajectory path based on a first geographical location to a second geographical location by using the trajectories that are closest in distance to the first and the second geographical locations. The trajectory route service 106 computes a secondary trajectory path based on the second geographical location to a third geographical location by using the trajectories that are closest in distance to the second and the third geographical locations, and refines the initial and the secondary trajectory paths by computing a trajectory route that sequentially connects the initial and the secondary trajectory paths.

The trajectory route service 106 adapts the k-NN algorithm to find the best trajectory with respect to the order of travel specified by the user 108. Using the candidate trajectory $R_x \in C$ that is generated by the k-NN algorithm, some of the trajectory points are scanned by the λ-NN searches. For a set of scanned points on $R_x$ by $R_x'$, the equation shows:

$$R_x' = \{p_i | p_i \in R_x, p_i \in S\}$$

where $S = \lambda\text{-NN}(q_1) \cup \lambda\text{-NN}(q_2) \cup \ldots \cup \lambda\text{-NN}(q_m)$. The $R_x'$, is a sub-trajectory that includes only a subset of points on $R_x$. The trajectory route service 106 allows $R_x'$, following the order of $R_x$. The equation for order specified similarity function is $\text{Sim}_o(Q, R_x) \geq \text{Sim}_o(Q, R_x')$. The trajectory route service 106 uses another equation to calculate a new lower bound $LB_o$ of similarity for ordered geographical locations by using a partially retrieved trajectory points of $R_x$. The equation for calculating the $LB_o$ follows:

$$LB_o(R_x) = \text{Sim}_o(Q, R_x') = DP(Q, R_x')$$

where DP $(Q, R_x')$ is calculated using the algorithm shown below.

| Algorithm for Ordered Travel: DP(Q,R) |
| --- |
| 1  Matrix M[i,j]; |
| 2  ∀∈ [1,m],M[i,0] ← 0 |
| 3  ∀∈ [1,l],M[o,j] ← 0 |
| 4  for i=1 to m do |
| 5     for j=1 to l do |
| 6        if $e^{-Dist_e(Head(Q),Head(R))}$ + M[i − 1,j] > M[i,j − 1] |
|          then |
|          // match $q_i$ with $p_j$ and repeat $p_j$ |
| 7           M[i,j] ← |
|          $e^{-Dist_e(Head(Q),Head(R))}$ + M[i − 1,j] |
| 8        else |
|          // skip $p_j$ |
| 9           M[i,j] ← M[i,j − 1] |
| 10 Return M[m,l] |

The trajectory route service 106 refines the process by calculating the $UB_o$ (for ordered travel) for the candidate trajectories within the candidate set. The equation to use is:

$$UB_o(R_x) = LB_o(R_x) + \sum_{i \in [1,m] \land R_x \notin C_i} \{e^{-Dist_e(r_i^x, q_u)}\}$$

where the k-NN algorithm may be adapted to find the best trajectory for the multiple geographical locations when the order of travel is specified by the user.

FIG. 10 illustrates an illustrative route 1000 provided by the trajectory route service 106. The user 108 specifies tourist attractions (e.g., landmark or famous name of attraction) by specifying an order of travel. The multiple locations are identified by landmarks, such as location 1, L1 is "The Capitol" 1002, location 2, L2 is "J. Edgar Hoover FBI Building" 1004, and location 3, L3 is "The National Mall" 1006. These are popular tourist attractions located in Washington, D.C. that a tourist, the user, or an agency could enter as input to receive the travel sequence in this order of locations 1, 2, and 3 (L1, L2, L3) based on the route along one way streets, on a bus route, or part of a travel agency's route.

In an implementation, the trajectory route service 106 receives user input specifying an order of travel for the geographical locations. The order is from first to third to second geographical locations. The trajectory route model provides an initial route based on a sequence of trajectories for the geographical locations. The trajectory route service calculates a new trajectory path based at least in part on using the points on the trajectories that are closest in distance to a first geographical location and a third geographical location. The trajectory route service calculates another new trajectory path based at least in part on the points on the trajectories that are closest in distance to the third and a second geographical locations, and refines the new trajectory and another new trajectory paths by computing the trajectory route based at least in part on the order of travel specified by the user that sequentially connects the first, the third, and the second geographical locations.

Exemplary Server Implementation

Figure 11:
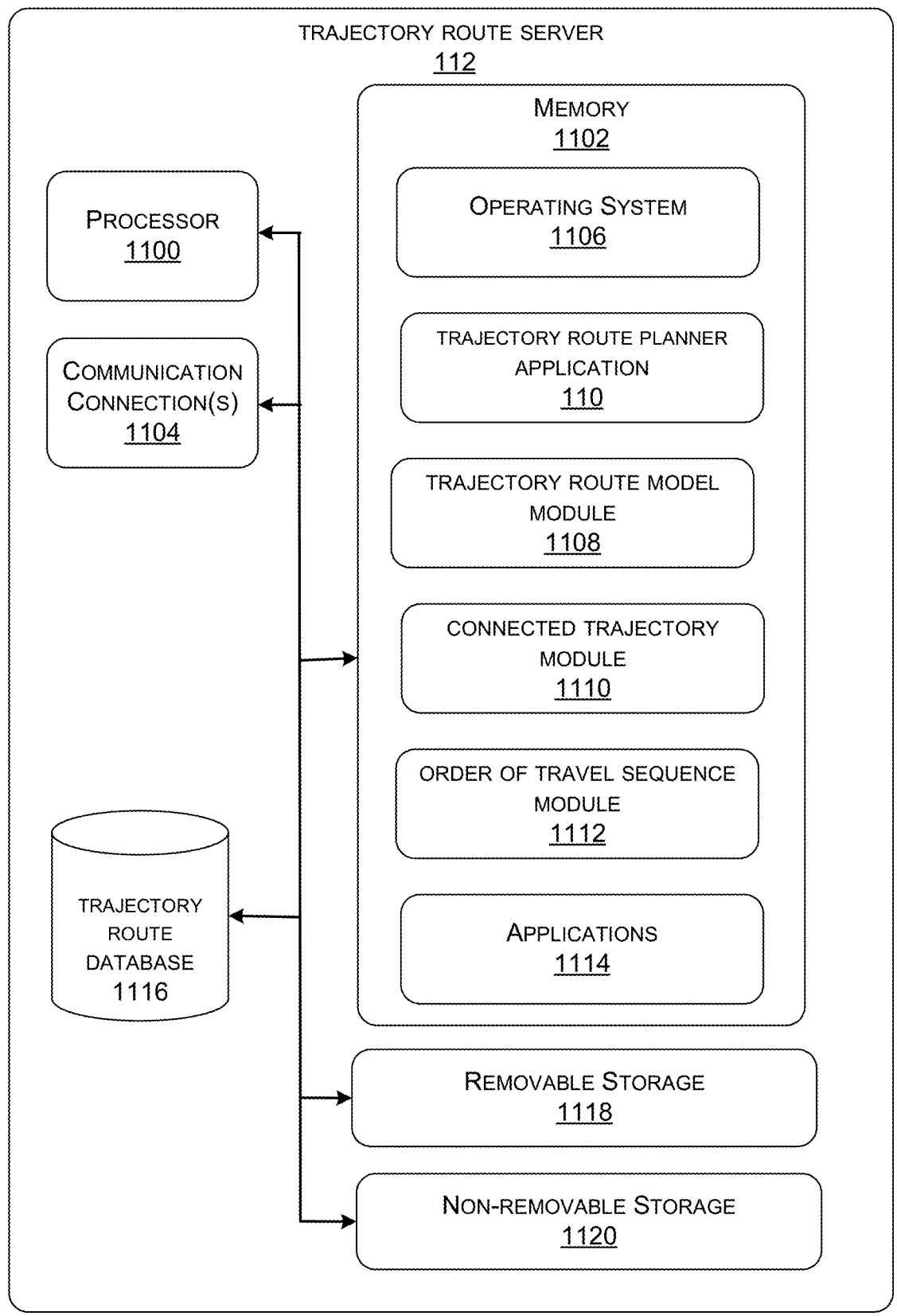
FIG. 11 is a block diagram showing an illustrative server usable with the architecture of FIG. 1.

FIG. 11 is a block diagram showing an illustrative server usable with the environment of FIG. 1. The trajectory route server 112 may be configured as any suitable system capable of services, which includes, but is not limited to, implementing the trajectory route service 106 for online services, such as providing recommendations for the trajectory route, a trip planner, and the like. In one illustrative configuration, the server 112 comprises at least one processor 1100, a memory 1102, and a communication connection(s) 1104. The communication connection(s) 1104 may include access to a wide area network (WAN) module, a local area network module (e.g., WiFi), a personal area network module (e.g., Bluetooth), and/or any other suitable communication modules to allow the server 112 to communicate over the network(s) 104.

Turning to the contents of the memory 1102 in more detail, the memory 1102 may store an operating system 1106, a module for the trajectory route application 110, a trajectory route model module 1108, a connected trajectory module 1110, and an order travel sequence module 1112. Furthermore, there may be one or more applications 1114 for implementing all or a part of applications and/or services using the trajectory route service 106. The applications 1114 may be for implementing other programs, such as email, voicemail, and the like.

The trajectory route service 106 provides access to the trajectory route application 110. The functions described may be performed by the trajectory route service 106 and/or the trajectory route application 110. The trajectory route service 106 receives the user queries, sends the routes, builds the model, constructs the route, and interacts with the other modules to provide directions with sequence for travel.

The trajectory route application module 110 interacts with the trajectory route service 106. It provides the display of the application on the user interface, interacts with information from the trajectory maps, models, and other modules to provide recommendations for travel.

The trajectory route model module 1108 preprocesses the GPS data (or other location based logs) to identify points on the trajectory of the GPS logs. The process includes collecting or receiving GPS logs, parsing trajectories from the log data, and identifying trajectories that have a proximal similarity to the geographical locations.

The connected trajectory module 1110 determines the trajectories from the GPS logs that are similar to the geographical locations of interest, determines the best trajectory that connects each of the geographical locations, and provides the trajectory route. The connected trajectory module 1110 applies the algorithms described.

The order of travel sequence module 1112 correlates the order of travel specified by the user 108. The order of travel sequence module 1112 identifies the travel sequence by reordering the sequence of travel for the trajectory points based on using the algorithms described above.

The server 112 may include a trajectory route database 1116 to store the collection of GPS logs, trajectories, data for the trajectory route model, and the like.

The server 112 may also include additional removable storage 1118 and/or non-removable storage 1120. Any memory described herein may include volatile memory (such as RAM), nonvolatile memory, removable memory, and/or non-removable memory, implemented in any method or technology for storage of information, such as computer-readable storage media, computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The server as described above may be implemented in various types of systems or networks. For example, the server may be a part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable storage media encoded with instructions that, when executed by a processor, perform acts comprising:
    receiving global position system (GPS) logs associated with respective individual devices, individual ones of the GPS logs including trajectories that connect a set of geographical locations previously visited by an individual of a respective individual device, the GPS logs having been received from GPS sensors associated with the respective individual devices;
    accessing a trajectory map constructed from the GPS logs;
    receiving a request for a travel route to multiple geographical locations of interest specified by a user;
    determining a trajectory that sequentially connects each of the multiple geographical locations and is within a threshold distance of at least one of the multiple geographical locations based at least in part on:
        applying a similarity function to the multiple geographical locations and the trajectories in the trajectory map, wherein the similarity function assesses similarity of the multiple geographical locations to geographic locations used in deriving the trajectories;

determining a plurality of trajectories that have respective proximal similarities to the multiple geographical locations that are less than a predetermined threshold; and determining an individual trajectory of the plurality of trajectories that sequentially connects the multiple geographical locations, the individual trajectory corresponding to the trajectory; and providing, as a response to the request for the travel route, the trajectory to a device associated with the user.

2. The computer-readable storage media of claim 1, wherein the multiple geographical locations of interest are identified by at least one of a street address, a name of an attraction, a building name, a type of a location, a highway, a beach, a school, an arena, or a stadium.

3. The computer-readable storage media of claim 1, wherein determining the trajectory further comprises using a k-nearest neighbor (k-NN) algorithm to determine that the individual trajectory is a closest trajectory to at least one geographical location of the multiple geographical locations based at least in part on searching the plurality of trajectories using a k-nearest neighbor (k-NN) search.

4. The computer-readable storage media of claim 1, the acts further comprising:

receiving another request specifying an order for visiting the multiple geographical locations; and determining that the individual trajectory sequentially connects the multiple geographical locations in the order.

5. The computer-readable storage media of claim 1, the acts further comprising:

presenting a dynamic user interface via the device associated with the user, the dynamic user interface configured to enable the user to select the multiple geographical locations of interest;

receiving an indication of a selection of the multiple geographical locations of interest via the dynamic user interface; and receiving the request for the travel route to the multiple geographical locations based at least in part on the indication.

6. The computer-readable storage media of claim 5, wherein the dynamic user interface comprises a map.

7. The computer-readable storage media of claim 1, the acts further comprising determining a subset of the plurality of trajectories based at least in part on searching the plurality of trajectories, the searching comprising:

identifying individual trajectories of the plurality of trajectories that are within an intersection of the multiple geographical locations; and determining one or more individual trajectories that are closest in distance to the multiple geographical locations, the one or more individual trajectories comprising the subset.

8. The computer-readable storage media of claim 7, the acts further comprising determining the individual trajectory from the subset.

9. The computer-readable storage media of claim 1, the acts further comprising:

computing a lower bound of proximal similarity for first individual trajectories of the plurality of trajectories;

computing an upper bound of proximal similarity for second individual trajectories that are external to the plurality of trajectories;

removing one or more trajectories of the plurality of trajectories based at least in part on the lower bound and upper bound to generate a refined set of trajectories; and determining the individual trajectory from the refined set of trajectories.

10. A computer-implemented method comprising:

receiving global position system (GPS) logs associated with respective individual devices, individual ones of the GPS logs including trajectories that connect a set of geographical locations previously visited by an individual of a respective individual device, the GPS logs having been received from GPS sensors associated with the respective individual devices;

accessing a trajectory map constructed from the GPS logs;

receiving a request for a travel route to multiple geographical locations of interest specified by a user;

determining a trajectory that sequentially connects each of the multiple geographical locations and is within a threshold distance of at least one of the multiple geographical locations based at least in part on:

applying a similarity function to the multiple geographical locations and the trajectories in the trajectory map, wherein the similarity function assesses similarity of the multiple geographical locations to geographic locations used in deriving the trajectories;

determining a plurality of trajectories that have respective proximal similarities to the multiple geographical locations that are less than a predetermined threshold; and determining an individual trajectory of the plurality of trajectories sequentially connects the multiple geographical locations, the individual trajectory corresponding to the trajectory; and providing the trajectory to a device associated with the user.

11. The computer-implemented method of claim 10, further comprising determining a subset of the plurality of trajectories based at least in part on searching the plurality of trajectories, the searching comprising:

identifying individual trajectories of the plurality of trajectories that are within an intersection of the multiple geographical locations; and determining one or more individual trajectories are closest in distance to the multiple geographical locations, the one or more individual trajectories comprising the subset.

12. The computer-implemented method of claim 11, further comprising determining the individual trajectory from the subset.

* * * * *